US012744691B2

(12) United States Patent
Duan et al.

(10) Patent No.: US 12,744,691 B2
(45) Date of Patent: Sep. 22, 2026

(54) NETWORK ASSISTED TIME REVERSAL RADIO FREQUENCY SENSING

(71) Applicant: QUALCOMM Incorporated, San Diego, CA (US)

(72) Inventors: Weimin Duan, San Diego, CA (US); Hyojin Lee, San Diego, CA (US); Bala Ramasamy, San Marcos, CA (US)

(73) Assignee: QUALCOMM Incorproated, San Diego, CA (US)

( * ) Notice: Subject to any disclaimer, the term of this patent is extended or adjusted under 35 U.S.C. 154(b) by 139 days.

(21) Appl. No.: 18/241,269

(22) Filed: Sep. 1, 2023

(65) Prior Publication Data

US 2025/0080381 A1 Mar. 6, 2025

(51) Int. Cl.
*H04L 25/02* (2006.01)
*H04L 25/03* (2006.01)

(52) U.S. Cl.
CPC ...... *H04L 25/0212* (2013.01); *H04L 25/0398* (2013.01)

(58) Field of Classification Search
CPC ............. H04L 25/0212; H04L 25/0254; H04L 25/03343; H04L 25/0398; G01S 7/006; G01S 13/003; G01S 13/582
See application file for complete search history.

(56) References Cited

U.S. PATENT DOCUMENTS

2010/0315962 A1 12/2010 Imai et al.
2022/0026551 A1 1/2022 Park et al.
2023/0035971 A1 * 2/2023 Girnyk .................... G06N 3/08

FOREIGN PATENT DOCUMENTS

WO 2022235336 11/2022

OTHER PUBLICATIONS

Partial International Search Report—PCT/US2024/041233—ISA/EPO—Dec. 23, 2024.
International Search Report and Written Opinion—PCT/US2024/041233—ISA/EPO—Mar. 12, 2025.

* cited by examiner

*Primary Examiner* — David B Lugo
(74) *Attorney, Agent, or Firm* — Holland & Hart LLP

(57) ABSTRACT

Techniques are provided for implementing time reversed reference signals for radio frequency (RF) sensing operations in a communication system. An example method for generating channel reciprocity information for radio frequency sensing operations includes receiving radio frequency sensing information from a sensing node, generating a channel reciprocity prediction based at least in part on the radio frequency sensing information and a channel reciprocity prediction model, and providing an indication for time reversal precoding to the sensing node based on the channel reciprocity prediction.

30 Claims, 21 Drawing Sheets

NETWORK ASSISTED TIME REVERSAL RADIO FREQUENCY SENSING

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

5G enables the utilization of RF signals for wireless communication between network nodes, such as base stations, user equipment (UEs), vehicles, factory automation machinery, and the like. However, the RF signals may also be used for RF sensing applications such as autonomous driving, intruder detection, gesture recognition, beam management, and other macro and micro sensing applications. Channel information and other signaling may be exchanged within a wireless communication system to improve RF sensing object detection and tracking performance.

SUMMARY

An example method for generating time reversal precoding information for radio frequency sensing operations according to the disclosure includes determining channel reciprocity information for a sensing channel associated with a first sensing node and a second sensing node, generating time reversal precoding information based at least in part on the channel reciprocity information, and providing the time reversal precoding information to at least one of the first sensing node and the second sensing node.

An example method for training a channel reciprocity prediction model according to the disclosure includes transmitting a first radio frequency sensing signal, receiving a first channel metric based on the first radio frequency sensing signal, receiving a second radio frequency sensing signal, determining a second channel metric based on the second radio frequency sensing signal, and providing indications of the first channel metric and the second channel metric to a network entity.

An example method for generating channel reciprocity information for radio frequency sensing operations according to the disclosure includes receiving radio frequency sensing information from a sensing node, generating a channel reciprocity prediction based at least in part on the radio frequency sensing information and a channel reciprocity prediction model, and providing an indication for time reversal precoding to the sensing node based on the channel reciprocity prediction.

Items and/or techniques described herein may provide one or more of the following capabilities, as well as other capabilities not mentioned. A wireless node may be capable of transmitting and/or receiving radio frequency (RF) sensing signals. The wireless node may utilize the same receivers for both communications and RF sensing operations. Channel information may be obtained for one or more channels utilized for RF sensing operations. Time reversing filters may be generated based on the channel information. Network entities may be configured to provide the channel information, and RF sensing signals may be time reversed based on the time reversing filters. Time reversing filters are dependent on reciprocal channel conditions. Wireless nodes may be configured to report channel reciprocity information such as channel estimates, signal to noise measurements, Doppler observations, and other non-radio frequency information which may impact the channel. A network entity may utilize a machine learning model to predict channel reciprocity based on reported channel reciprocity information. The network entity may be configured to provide an indication to a wireless node to activate or deactivate time reversal precoding based on an output of the machine learning model. Wireless nodes may be configured to deactivate time reversal precoding when the channel reciprocity is low, or the wireless node is not capable of implementing time reversal precoding due to hardware or software limitations. Other capabilities may be provided and not every implementation according to the disclosure must provide any, let alone all, of the capabilities discussed.

DETAILED DESCRIPTION

Figure 1:
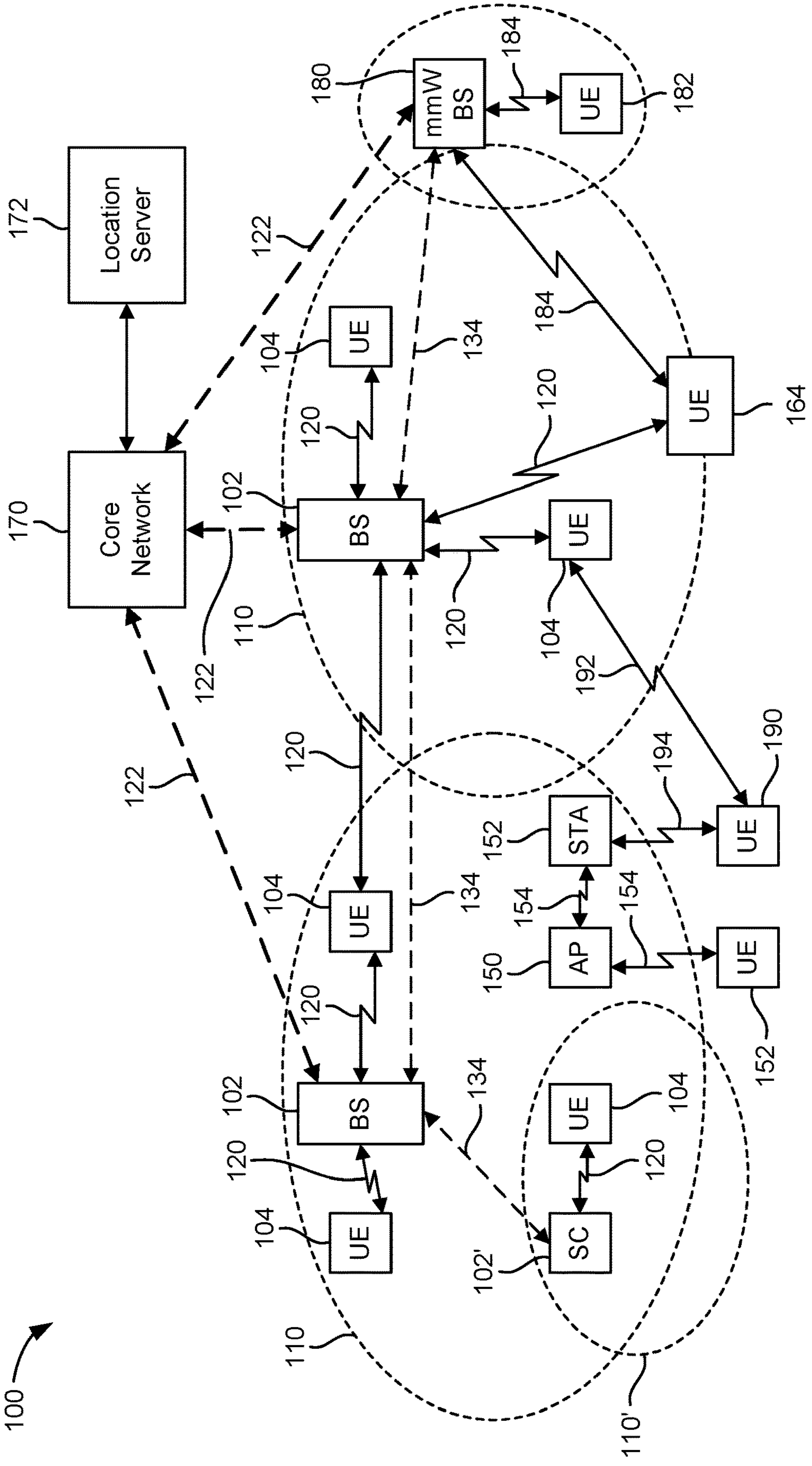
FIG. 1 illustrates an example wireless communications system.

Techniques are provided herein for implementing time reversal reference signals for radio frequency (RF) sensing operations in a communication system. In general, RF sensing may be regarded as consumer-level radar with advanced detection capabilities. For example, RF sensing may be used in applications such as health monitoring (e.g., heartbeat detection, respiration rate monitoring, etc.), gesture recognition (e.g., human activity recognition, keystroke detection, sign language recognition), contextual information acquisition (e.g., location detection/tracking, direction finding, range estimation), automotive radar (e.g., smart cruise control, collision avoidance) and the like. Due to the increased bandwidth allocations for cellular communications systems (e.g., 5G and beyond), and the development of more use cases for cellular communications, capabilities for integrated RF sensing and communication applications may be a requirement for future cellular systems.

Time reversed RF sensing signals may be utilized to reduce the impact of multipath propagation on object detection and tracking. The multipath propagation may increase the clutter of the received RF sensing signals due to the background scattering of the transmitted RF signals. RF sensing based target detection and parameter estimation may be impacted by the multipath propagation. Such multipath propagation may be unavoidable for some cellular RF sensing scenarios, such as urban areas and indoor environments. In a low signal-to-noise (SNR) range, the target related paths with low power may not be successfully detected by a receiver. The signal power spread may lead to per channel tap SNR drop, which may make the target detection more challenging in multipath rich environments. For example, a RF sensing receiver may receive return signals via multiple paths for a single target object. The multipath effects could degrade target detection and tracking performance because of the corresponding signal power spread and the per channel tap SNR drop. Further, ghost targets may be generated based on multiple bounces in the propagation path. Time reversal (TR) RF sensing signals may be used to reduce the impact of multipath propagation. In operation, however, the performance of uplink and downlink TR RF sensing may depend on the channel reciprocity between the uplink and downlink channels. Further, various hardware and software configurations of wireless nodes in a communication network may impact the ability of a wireless node to utilize TR RF sensing. The techniques provided herein may be implemented by wireless nodes and other network entities (e.g., network servers) to provide TR configuration information for RF sensing operations. In an example, a wireless node may be configured to provide channel reciprocity information to a network entity. The channel reciprocity information may include signal to noise ratio (SNR) measurements, Doppler observations, and/or machine learning (ML) based channel reciprocity predictions. In an example, the network entity (e.g., sensing server, base station) may request a wireless node to activate or deactivate TR precoding on RF sensing signals. The network entity may be configured to activate TR precoding in a particular zone based on the channel reciprocity within that zone. In an example, the wireless nodes may be configured to deactivate TR precoding based on the hardware and/or software configuration of the wireless node. The wireless nodes may be configured to provide TR precoding capability reports indicating an ability of a wireless node to implement TR precoding for RF sensing signals.

Particular aspects of the subject matter described in the disclosure may be implemented to realize one or more of the following potential advantages. Time reversed RF sensing signals may be generated and transmitted to reduce the impact of the multipath effects. Channel reciprocity information may be utilized to improve the performance of RF sensing operations. Wireless nodes, such as user equipment (UE), may be configured to provide RF sensing capabilities information including an indication of an ability to perform time reversal precoding. The network may configure time reversal precoding based in part on the capabilities of the UE. Unnecessary or incompatible TR precoding processing may be reduced. ML models for predicting channel reciprocity may be trained and utilized for generating TR precoding information. Sensed object information and non-radio frequency information may be used in the ML models. RF sensing ML models may be propagated in a communication system to increase the accuracy of RF sensing operations. These techniques and configurations are examples, and other techniques and configurations may be used.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words “exemplary” and/or “example” are used herein to mean “serving as an example, instance, or illustration.” Any aspect described herein as “exemplary” and/or “example” is not necessarily to be construed as preferred or advantageous over other aspects. Likewise, the term “aspects of the disclosure” does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" (BS) are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Referring to FIG. 1, an example wireless communications system 100 is shown. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for nonaccess stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STA 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHZ unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHZ and 30 GHZ, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHZ), FR3 (above 52600 MHZ), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over communication links 120 and/or the mmW base station 180 over a mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
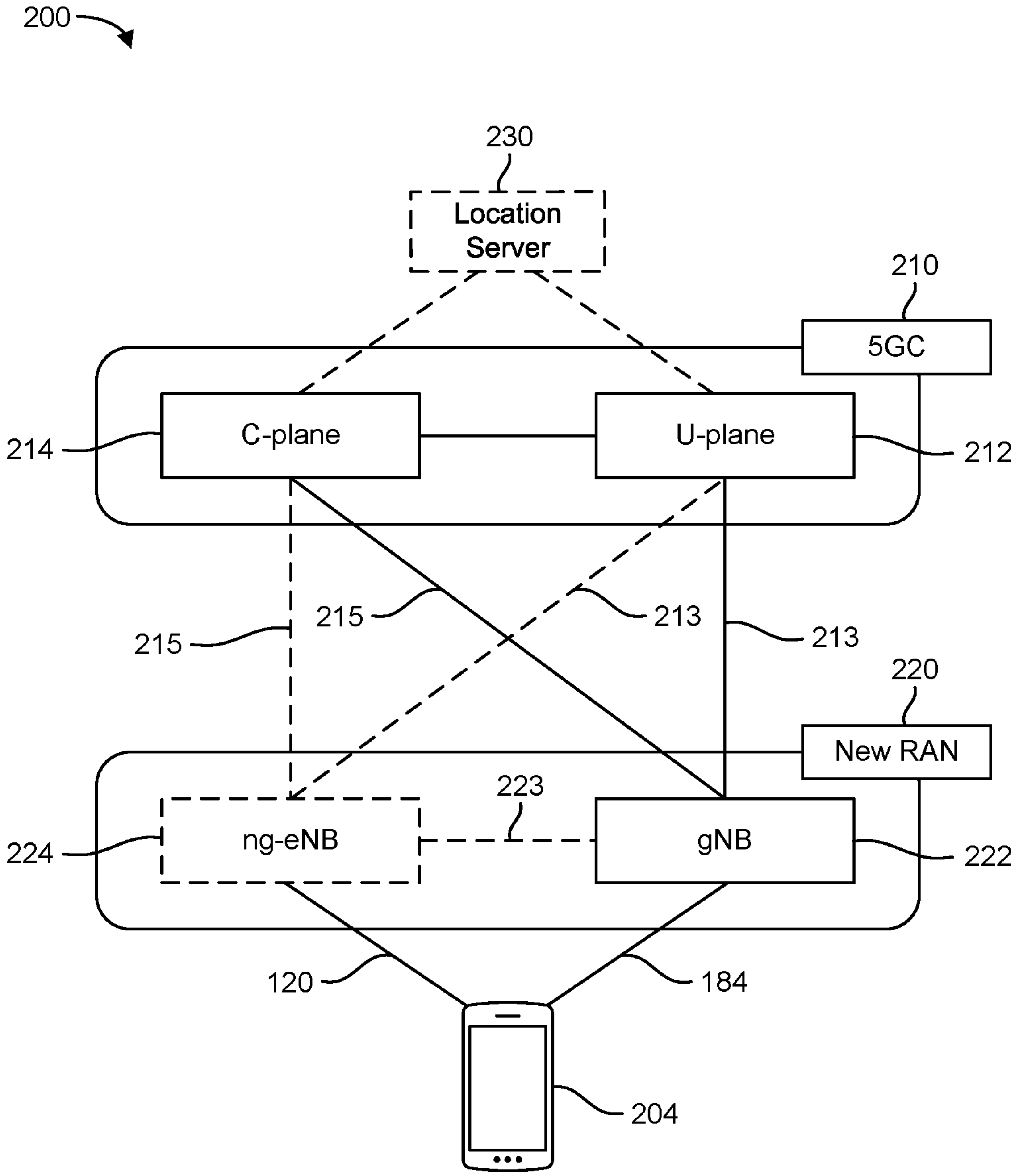
FIGS. 2A and 2B illustrate example wireless network structures.

Referring to FIG. 2A, an example wireless network structure 200 is shown. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
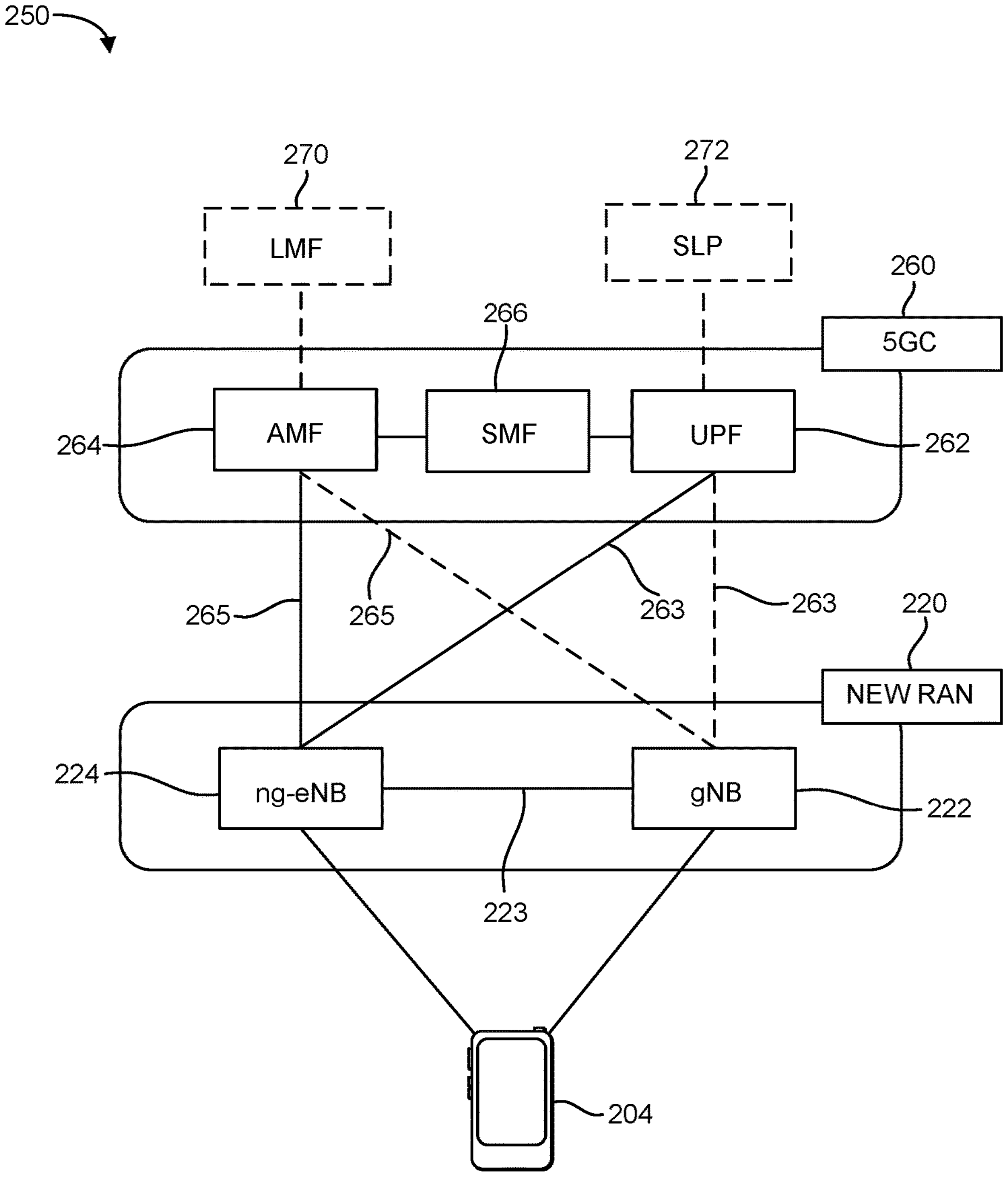

Referring to FIG. 2B, another example wireless network structure 250 is shown. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

In an aspect, the LMF 270 and/or the SLP 272 may be integrated into a base station, such as the gNB 222 and/or the ng-eNB 224. When integrated into the gNB 222 and/or the ng-eNB 224, the LMF 270 and/or the SLP 272 may be referred to as a "location management component," or "LMC." However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

Figure 3A:
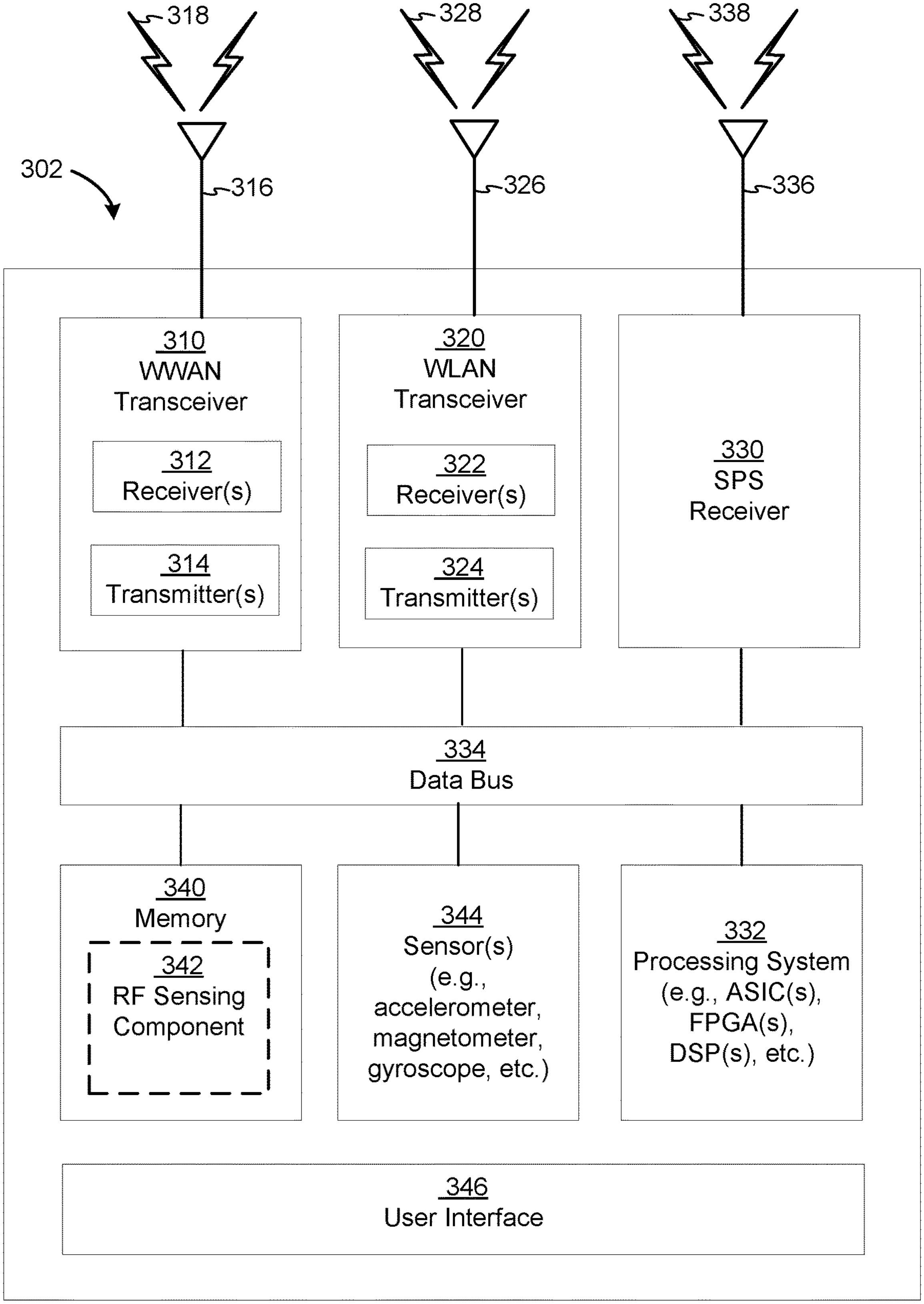
FIGS. 3A to 3C are simplified block diagrams of several sample components that may be employed in wireless communication nodes and configured to support communication and radio frequency sensing.
Figure 3B:
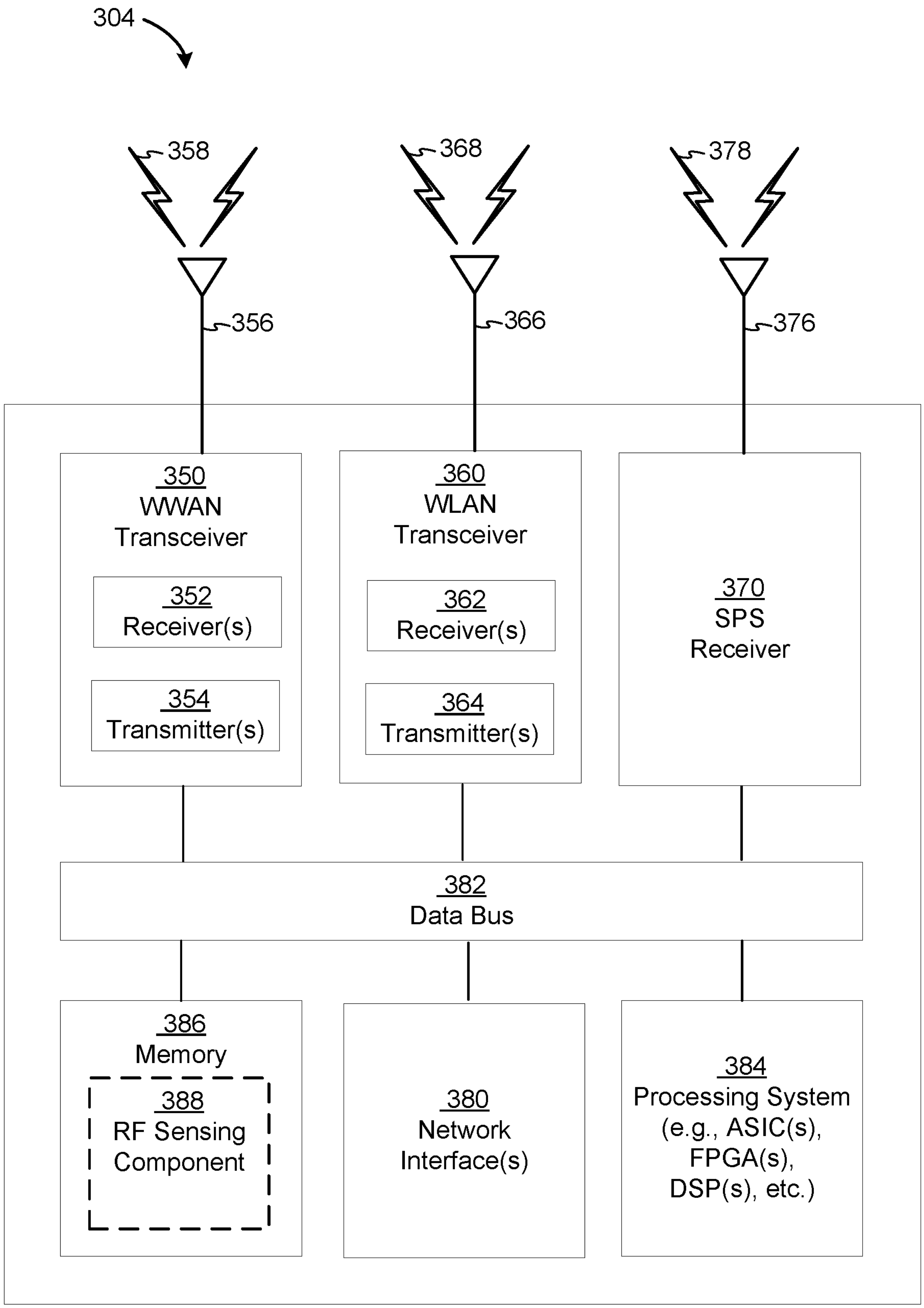
Figure 3C:
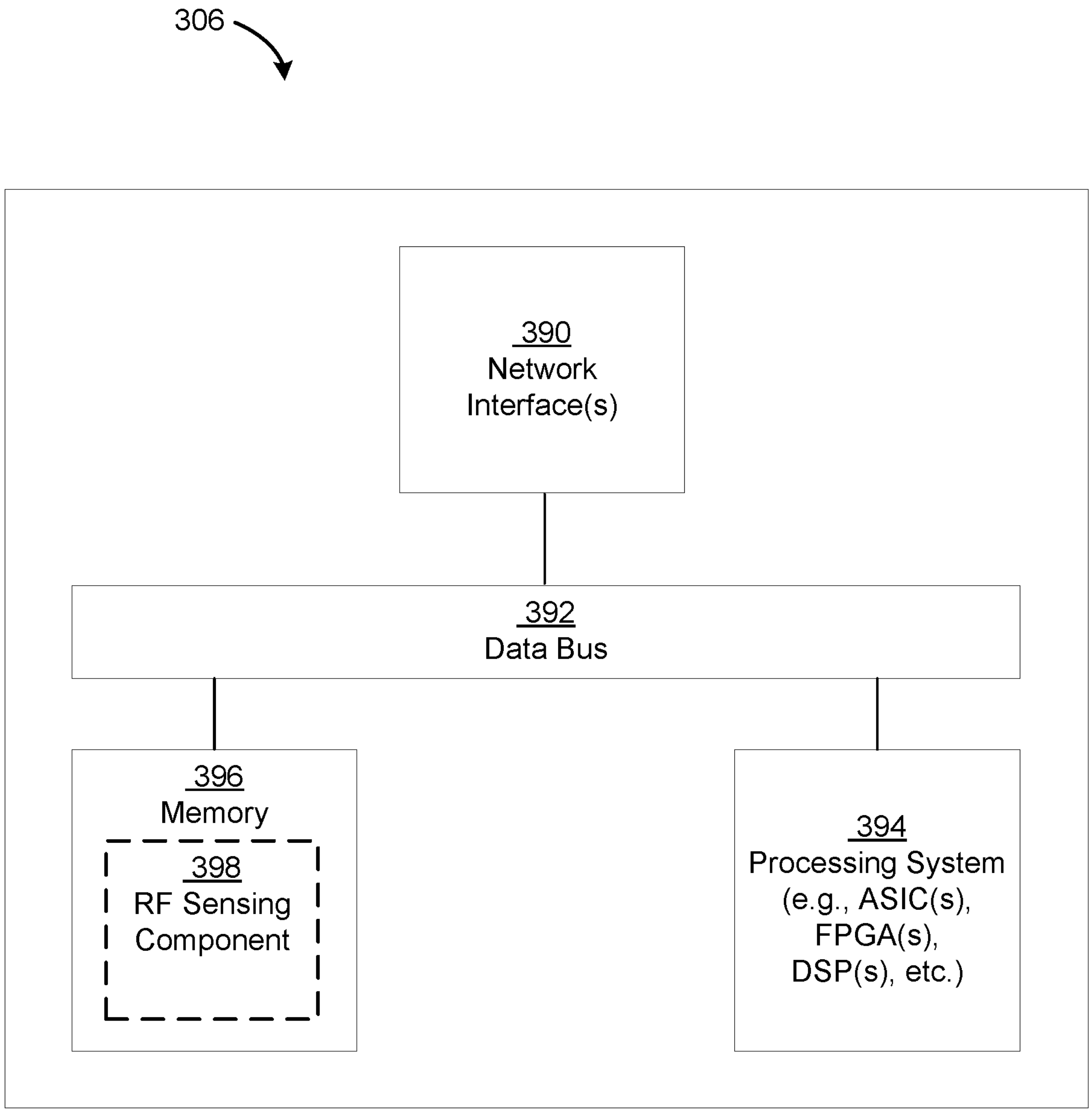

Referring to FIGS. 3A, 3B and 3C, several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations are shown. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, joint communication and RF sensing (i.e., integrated sensing and communications (ISAC) operations), and for providing other processing functionality. The base station 304 includes a processing system 384 for providing functionality relating to, for example, ISAC operations as disclosed herein, and for providing other processing functionality. The network entity 306 includes a processing system 394 for providing functionality relating to, for example, ISAC operations as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include RF sensing components 342, 388, and 398, respectively. The RF sensing components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the RF sensing components 342, 388, and 398 may be external to the processing systems 332, 384, and 394 (e.g., part of a modem processing system, integrated with another processing system, etc.). Alternatively, the RF sensing components 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting: PDCP layer functionality associated with header compression/decompression, security (ciphering, deciphering, integrity protection, integrity verification), and handover support functions: RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting: PDCP layer functionality associated with header compression/decompression, and security (ciphering, deciphering, integrity protection, integrity verification): RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by components 310 to 346 may be implemented by processor and memory component(s) of the UE 302 (e.g., by execution of appropriate code and/or by appropriate configuration of processor components). Similarly, some or all of the functionality represented by components 350 to 388 may be implemented by processor and memory component(s) of the base station 304 (e.g., by execution of appropriate code and/or by appropriate configuration of processor components). Also, some or all of the functionality represented by components 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the RF sensing components 342, 388, and 398, etc.

Wireless communication signals (e.g., RF signals configured to carry OFDM symbols) transmitted between a UE and a base station can be reused for environment sensing (also referred to as "RF sensing" or "radar"). Using wireless communication signals for environment sensing can be regarded as consumer-level radar with advanced detection capabilities that enable, among other things, touchless/device-free interaction with a device/system. The wireless communication signals may be cellular communication signals, such as LTE or NR signals, WLAN signals, etc. As a particular example, the wireless communication signals may be an OFDM waveform as utilized in LTE and NR. High-frequency communication signals, such as mmW RF signals, are especially beneficial to use as radar signals because the higher frequency provides, at least, more accurate range (distance) detection.

Figure 4A:
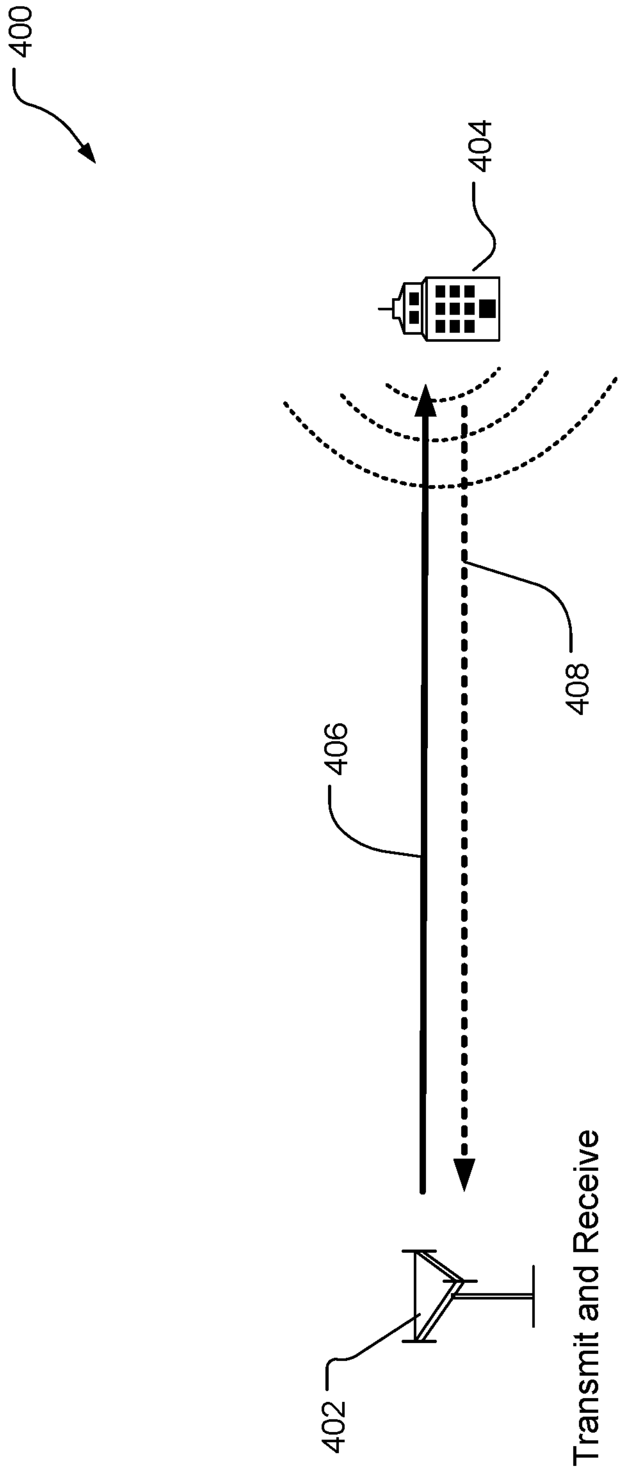
FIG. 4A illustrates an example monostatic RF sensing system.
Figure 4B:
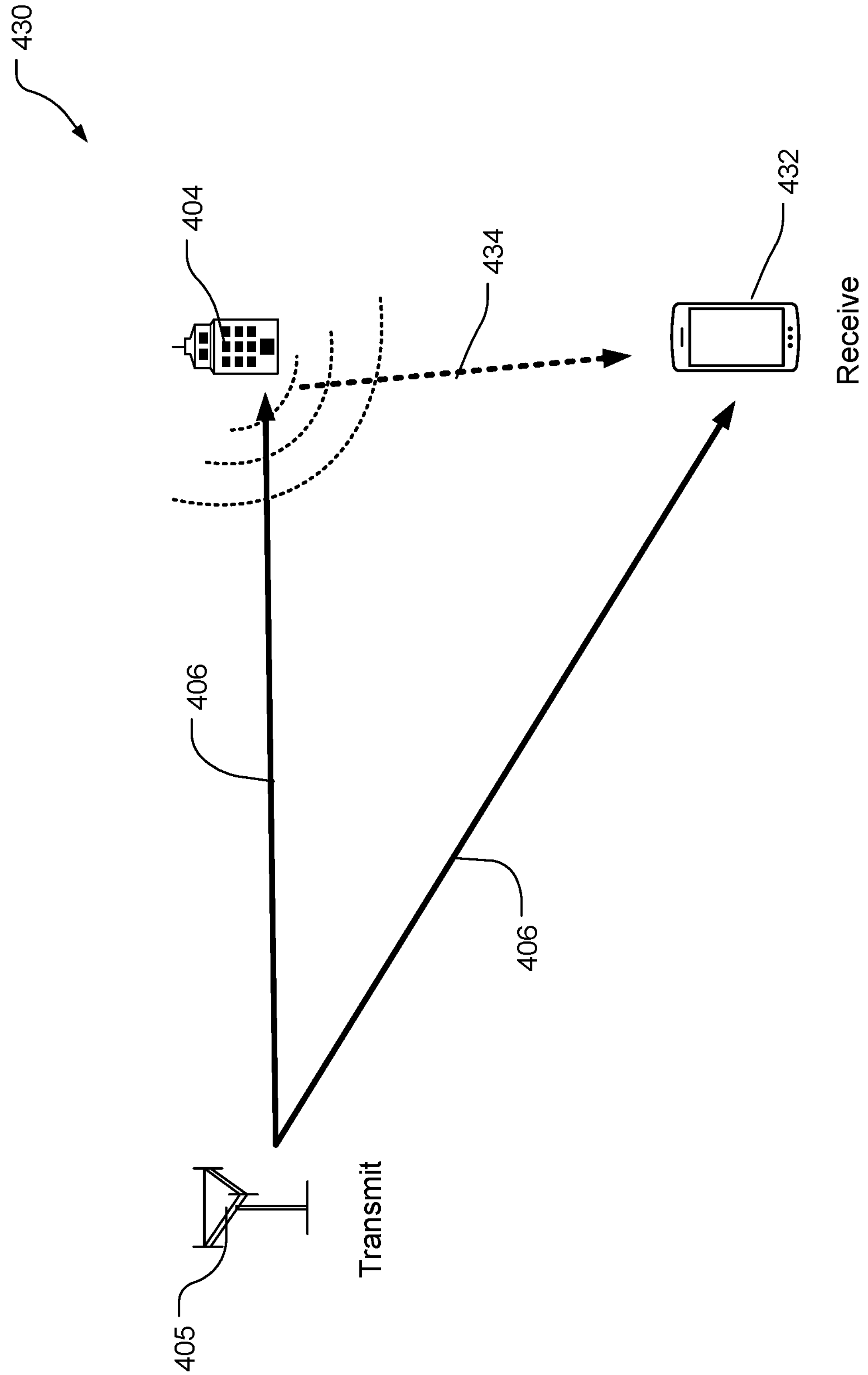
FIG. 4B illustrates an example bistatic RF sensing system.

In general, there are different types of RF sensing, and in particular, monostatic and bistatic (e.g., multistatic) RF sensing. FIGS. 4A and 4B illustrate two of these various types of RF sensing. Specifically, FIG. 4A is a diagram 400 illustrating a monostatic RF sensing scenario, and FIG. 4B is a diagram 430 illustrating a bistatic RF sensing scenario. The concepts of the bistatic RF sensing scenario in FIG. 4B may be extended to multiple stations for multistatic RF sensing. In FIG. 4A, a base station 402 may be configured for full duplex operation and thus the transmitter (Tx) and receiver (Rx) are co-located. For example, a transmitted radio frequency (RF) signal 406 may be reflected off of a target object, such as a building 404, and the receiver on the base station 402 is configured to receive and measure a reflected beam 408. This is a typical use case for traditional, or conventional, RF sensing. In an example, monostatic RF sensing may be realized with half duplex operation such that a transceiver may be configured to transmit a RF sensing signal at a first time, and then receive a reflected signal at a second time. In FIG. 4B, a base station 405 may be configured as a transmitter (Tx) and a UE 432 may be configured as a receiver (Rx). In this example, the transmitter and the receiver are not co-located, that is, they are separated. The base station 405 may be configured to transmit a beam, such as an omnidirectional downlink RF signal which may be received by the UE 432. A portion of the RF signal 406 may be reflected or refracted by the building 404 and the UE 432 may receive this reflected signal 434. This is the typical use case for wireless communication-based (e.g., WiFi-based, LTE-based, NR-based) RF sensing. Note that while FIG. 4B illustrates using a downlink RF signal 406 as a RF sensing signal, uplink RF signals can also be used as RF sensing signals. In a downlink scenario, as shown, the transmitter is the base station 405 and the receiver is the UE 432, whereas in an uplink scenario, the transmitter is a UE and the receiver is a base station.

Referring to FIG. 4B in greater detail, the base station 405 transmits RF sensing signals (e.g., OFDM reference signals or other waveforms) to the UE 432, but some of the RF sensing signals reflect off a target object such as the building 404. The UE 432 can measure the ToAs of the RF signal 406 received directly from the base station, and the ToAs of the reflected signal 434 which is reflected from the target object (e.g., the building 404).

The base station 405 may be configured to transmit the single RF signal 406 or multiple RF signals to a receiver (e.g., the UE 432). However, the UE 432 may receive multiple RF signals corresponding to each transmitted RF signal due to the propagation characteristics of RF signals through multipath channels. Each path may be associated with a cluster of one or more channel taps. Generally, the time at which the receiver detects the first cluster of channel taps is considered the ToA of the RF signal on the line-of-site (LOS) path (i.e., the shortest path between the transmitter and the receiver). Later clusters of channel taps are considered to have reflected off objects between the transmitter and the receiver and therefore to have followed non-LOS (NLOS) paths between the transmitter and the receiver.

Thus, referring back to FIG. 4B, the RF signal 406 follows a LOS path between the base station 405 and the UE 432, and the reflected signal 434 represents the RF sensing signals that followed a NLOS path between the base station 405 and the UE 432 due to reflecting off the building 404 (or another target object). The base station 405 may have transmitted multiple RF sensing signals (not shown in FIG. 4B), some of which followed the LOS path and others of which followed the NLOS path. Alternatively, the base station 405 may have transmitted a single RF sensing signal in a broad enough beam that a portion of the RF sensing signal followed the LOS path and a portion of the RF sensing signal followed the NLOS path.

Based on the difference between the ToA of the LOS path, the ToA of the NLOS path, and the speed of light, the UE 432 can determine the distance to the building 404. In addition, if the UE 432 is capable of receive-beam forming, the UE 432 may be able to determine the general direction to the building 404 as the direction of the reflected signal 434, which is the RF sensing signal following the NLOS path as received. The UE 432 may then optionally report this information to the transmitting base station 405, an application server associated with the core network, an external client, a third-party application, or some other entity. Alternatively, the UE 432 may report the ToA measurements to the base station 405, or other entity, and the base station 405 may determine the distance and, optionally, the direction to the target object.

Note that if the RF sensing signals are uplink RF signals transmitted by the UE 432 to the base station 405, the base station 405 may be configured to perform object detection based on the uplink RF signals just like the UE 432 does based on the downlink RF signals.

Figure 5:
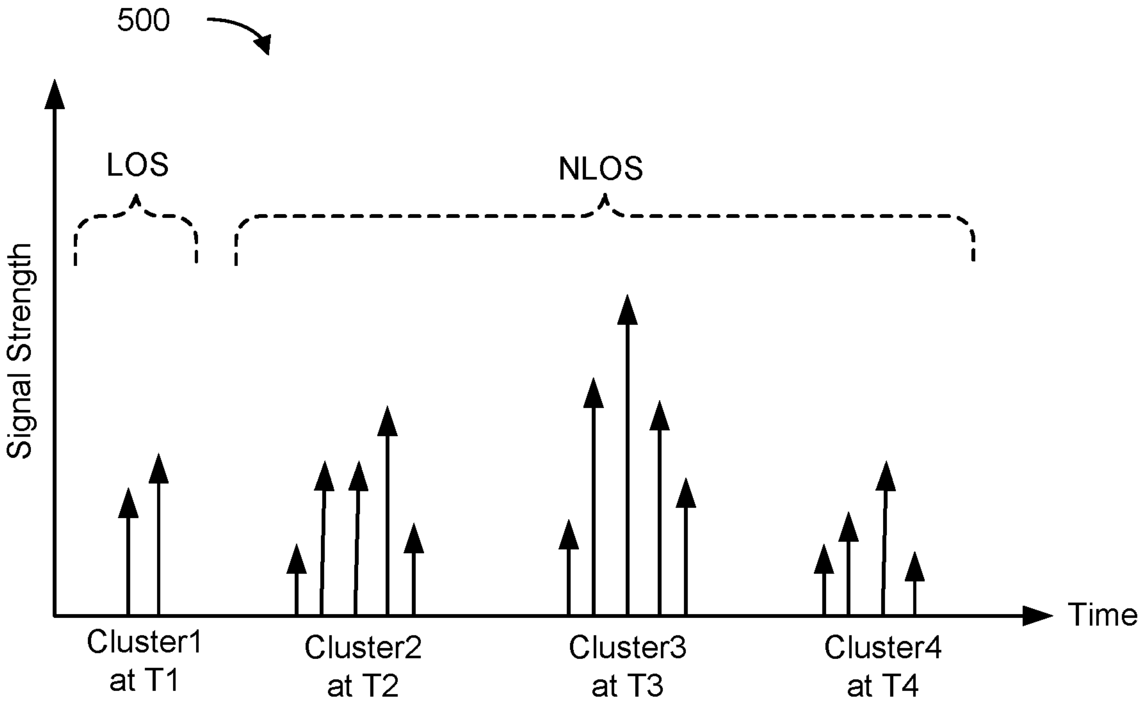
FIG. 5 is an example graph showing a radio frequency (RF) channel response over time.

Referring to FIG. 5, an example graph 500 showing an RF channel response at a receiver (e.g., any of the UEs or base stations described herein) over time is shown. In the example of FIG. 5, the receiver receives multiple (four) clusters of channel taps. Each channel tap represents a multipath that an RF signal followed between the transmitter (e.g., any of the UEs or base stations described herein) and the receiver. That is, a channel tap represents the arrival of an RF signal on a multipath. Each cluster of channel taps indicates that the corresponding multipaths followed essentially the same path. There may be different clusters due to the RF signal being transmitted on different transmit beams (and therefore at different angles), or because of the propagation characteristics of RF signals (potentially following widely different paths due to reflections), or both.

Under the channel illustrated in FIG. 5, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 5, because the first cluster of RF signals at time T1 arrives first, it is presumed to be the LOS data stream (i.e., the data stream arriving over the LOS or the shortest path), and may correspond to the LOS path illustrated in FIG. 4B (e.g., the RF signal 406). The third cluster at time T3 is comprised of the strongest RF signals, and may correspond to the NLOS path illustrated in FIG. 4B (e.g., the reflected signal 434). Note that although FIG. 5 illustrates clusters of two to five channel taps, as will be appreciated, the clusters may have more or fewer than the illustrated number of channel taps.

Figure 6:
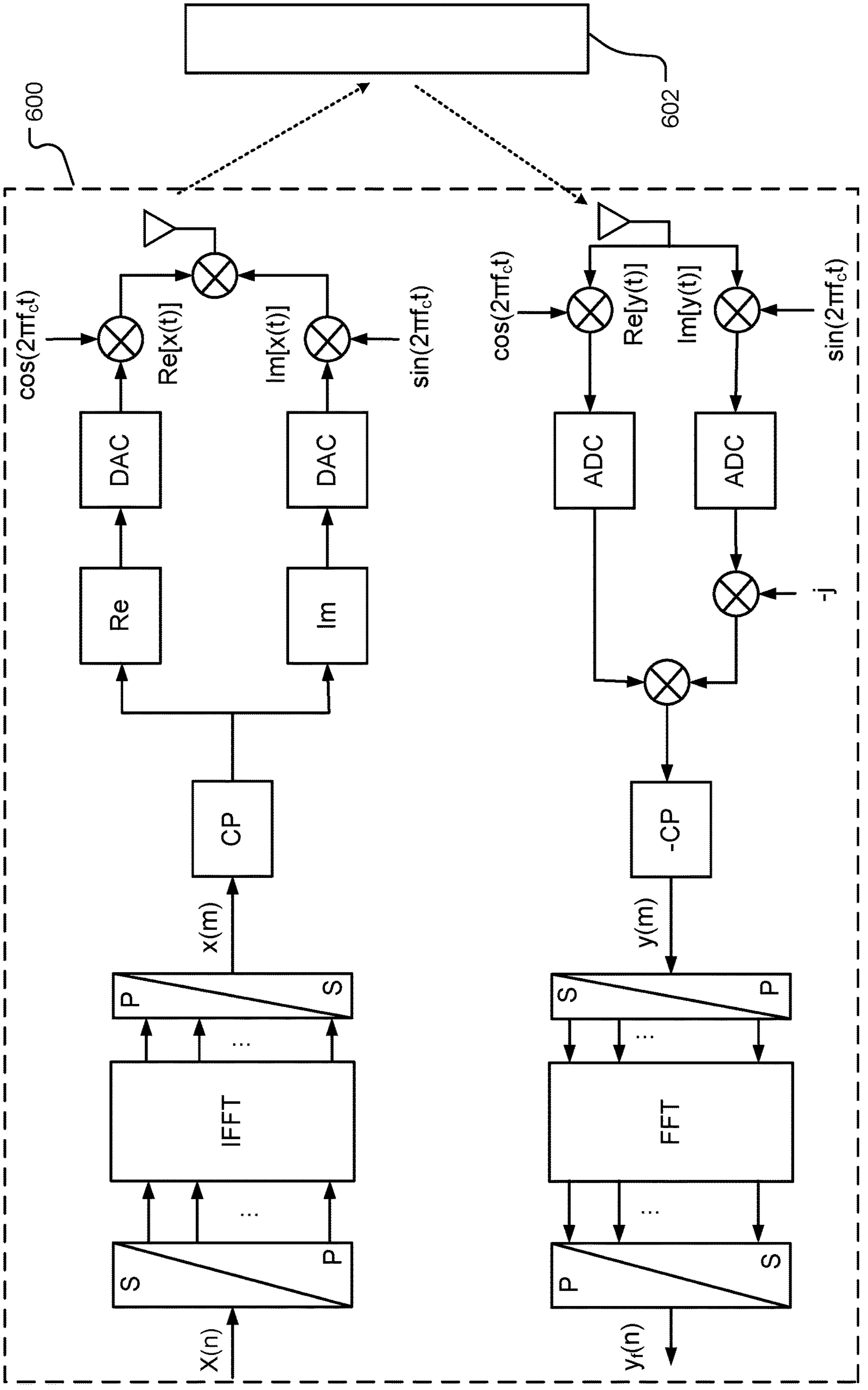
FIG. 6 is a block diagram of a prior art orthogonal frequency-division multiplexing (OFDM) system.

Referring to FIG. 6, a block diagram of a prior art OFDM system 600 is shown. The OFDM system 600 is an example of an ISAC capable OFDM transmitter and receiver that may be employed by the example wireless communication nodes described herein. The OFDM system 600 is configured to transmit OFDM signals which may be used for communications and RF sensing operations. OFDM symbols may be generated via Inverse Fast Fourier Transform (IFFT) and shifted into the RF band via quadrature modulation and transmitted over the channel, which may include one or more objects 602. A receiver may receive reflected signals and remove the cyclic prefix (CP) from the quadrature demodulated signal. Complex modulation symbols may be obtained via the FFT. The received waveform may be demodulated based on spectral division, which cancels out the transmitted complex modulation symbols by element-wise multiplication. This 2D-FFT processing enables distance-velocity RF sensing that is similar to frequency modulated continuous wave (FMCW) based radar systems.

Figure 7A:
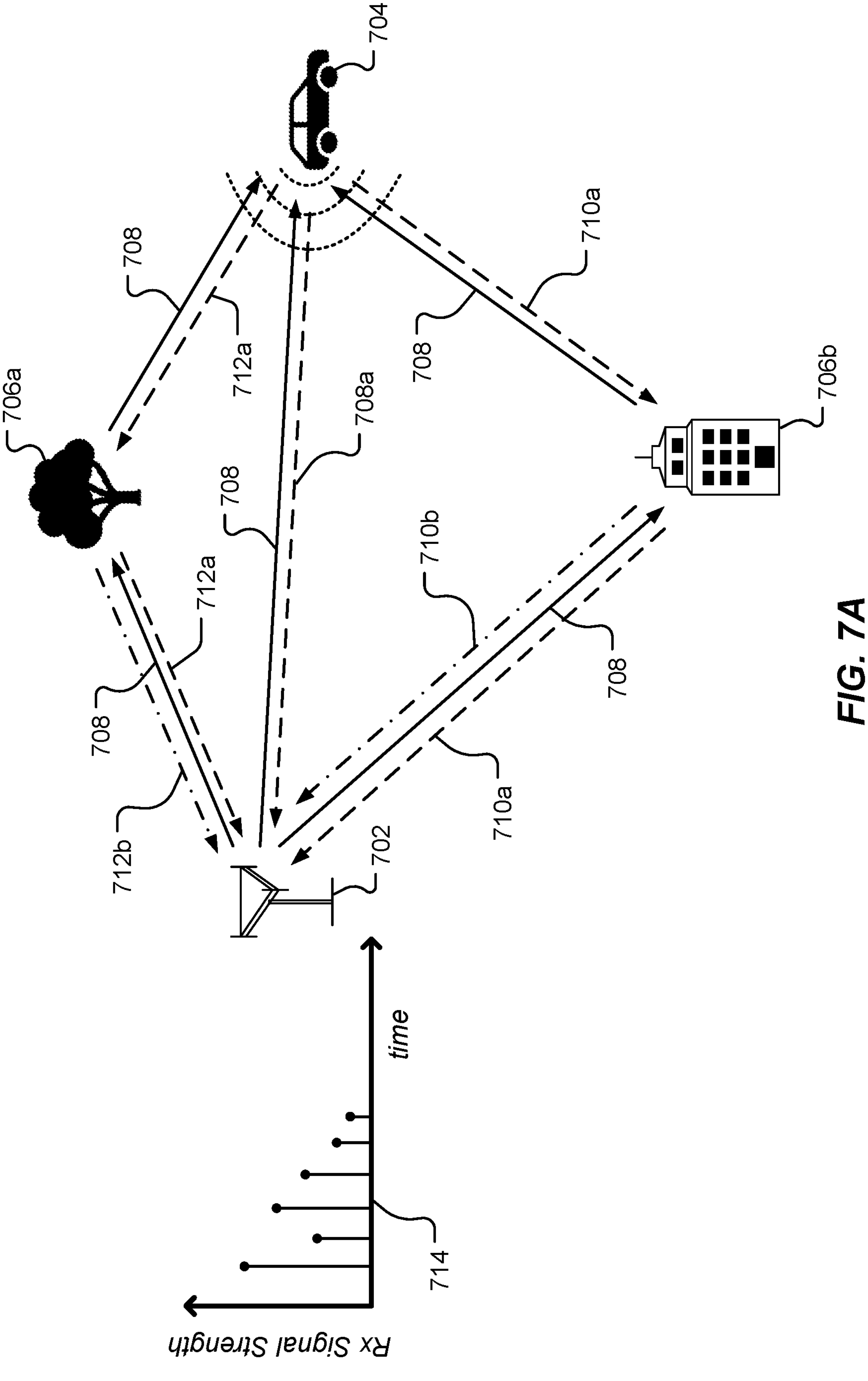
FIG. 7A is a diagram of example monostatic RF sensing operations with multipath signals.

Referring to FIG. 7A, a diagram of example monostatic RF sensing operations with multipath signals is shown. The diagram includes a base station 702 configured to transmit a first RF sensing signal 708 to detect a target object, such as a vehicle 704. The RF sensing signal 708 may follow multiple paths and multiple echo signals may be generated based on the multiple paths. The multiple paths may include reflecting part of the RF sensing signal 708 to the vehicle 704, and creating multiple echo signals for the target object and other objects. For example, a tree 706*a* and a building 706*b* may cause portions of the RF sensing signal 708 to reflect to the vehicle 704. The vehicle 704, the tree 706*a*, and the building 706*b* may also cause echo signals which may be received by the base station 702. For example, a LOS echo signal 708*a* may be reflected from the vehicle 704, as well as echoes generated from the multipath signals such as a first echo signal 710*a* and a second echo signal 712*a*. The echo signals 710*a* and 712*a* may also be reflected by the building 706*b* and the tree 706*a* and detected by the base station 702. The tree 706*a* and building 706*b* may each generate respective echo signals 712*b*, 710*b* which are received by the base station 702. A representation of the received RF sensing signal (i.e., based on the echo signals) is indicated in a first signal graph 714. The first signal graph 714 is an example of a first received RF sensing signal which may be received and time reversed to generate a time reversed RF sensing signal.

Figure 7B:
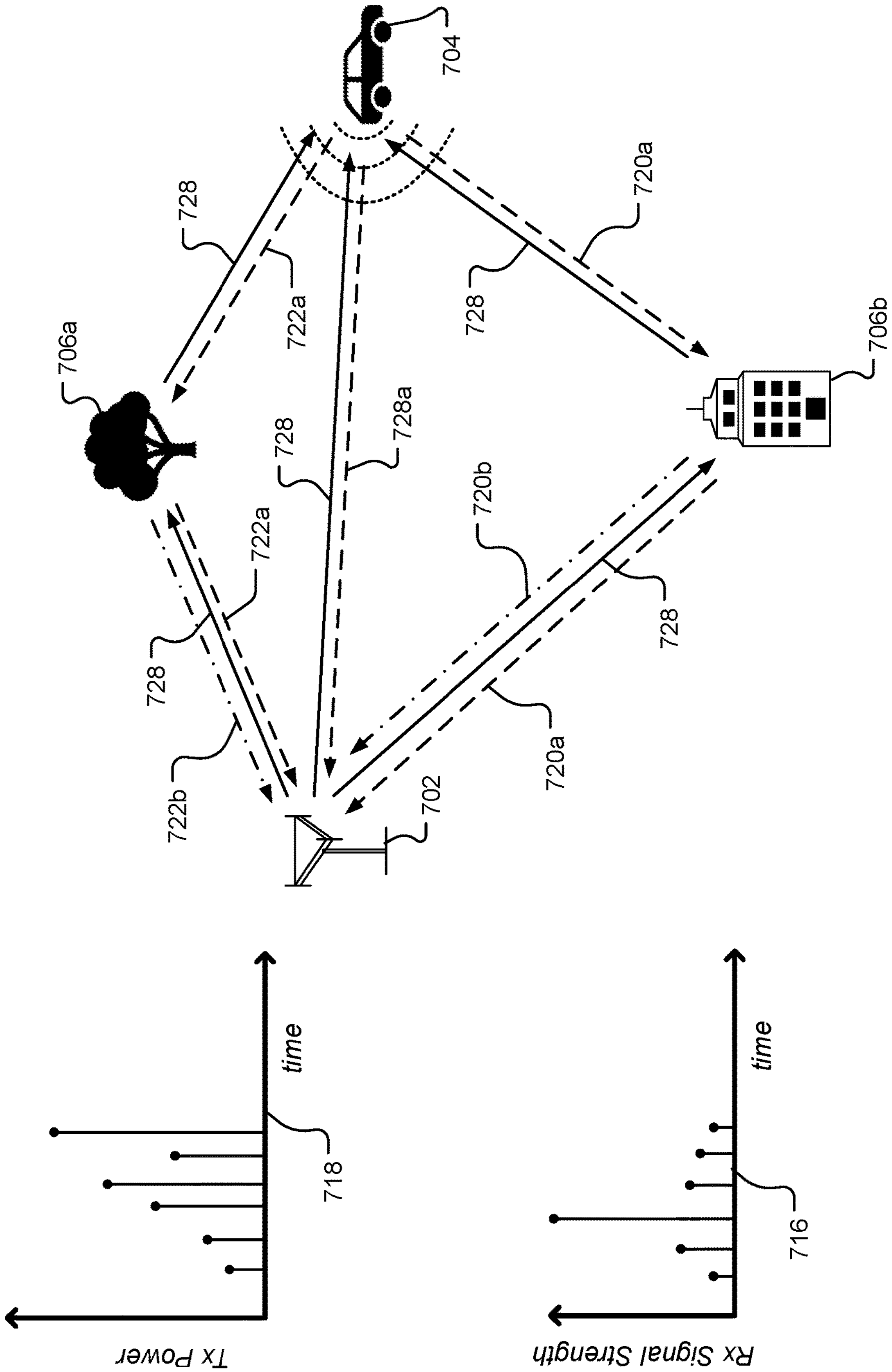
FIG. 7B is a diagram of the example monostatic RF sensing operations in FIG. 7A with a time reversed RF sensing signal.

Referring to FIG. 7B, with further reference to FIG. 7A, a diagram of example monostatic RF sensing operations with a time reversed signal is shown. A second signal graph 718 represents a time reversed signal based on the received RF sensing signal indicated in the first signal graph 714. The power levels of a transmitted RF sensing signal based on the second signal graph 718 may be normalized (e.g., each component may be increased by an amount). For example, the base station 702 may transmit a time reversed (TR) RF sensing signal 728 to improve the SNR for LOS path to the vehicle 704. The tree 706*a*, the building 706*b*, and the vehicle 704 may cause respective echo signals to be generated as described in FIG. 7A, but the TR RF sensing signal 728 may compress the multipath channel. For example, the echo signals 728*a*, 720*a*, 720*b*, 722*a*, 722*b* may be received by the base station 702. A third signal graph 716 represents the received RF sensing signal based on the TR RF sensing signal 728. As depicted in the third signal graph 716, the multipath signals are compressed relative to the LOS path and the SNR for the echo signals from the vehicle 704 is increased. The multipath channel in FIGS. 7A and 7B, and the corresponding signal graphs 714, 716, 718, are examples, and not limitations, to illustrate the compression of multipath signals based on TR RF sensing signals.

In an example, the time reversed signals described in FIGS. 7A and 7B may be realized with an implementation of a time reversal (TR) filter based on a known or estimated channel impulse response (CIR). In a TR transmission, a reference signal S may be pre-filtered with a time reversed filter:

$$S_t = S \circledast h(-t)^* \quad (1)$$

where the time reversal filter h (−t)* is the time reversed CIR between two wireless nodes, such as a UE and a gNB. In an example, the CIR may be determined based on an echo signal (e.g., in monostatic sensing). The filtered signal $S_t$ may be transmitted by one of the wireless nodes.

A resulting TR signal 'Y' received by the other wireless node may be written as:

$$Y = S \circledast h(-t)^* \circledast h(t) \quad (2)$$

At the receiver side, the equivalent CIR is $R_{hh}=h(-t)^* \circledast h(t)$, which is the channel autocorrelation.

Since TR filtering may compress the multipath channel, it may increase the SNR and improve the target detection performance. This technique to increase the SNR relies upon the knowledge of the channel, in particular, the CIR h(t) of the channel. Thus, in an aspect, TR precoding (TR filtering) of a reference signal (RS) at the transmitter may be based on a channel state information (CSI) between the transmitter and the receiver (e.g., CSI between a UE and a gNB) from which h(t) may be estimated. The TR precoding sequence h(−t)* is in the time domain but may be equivalently represented as TR filters H(f) in the frequency domain. Generating a TR RF sensing signal may include multiplying a RF sensing signal by the frequency domain filters H(f) before being transmitted. Since a signal may be multiplied by a precoder before transmission, each H(f) may be viewed as a TR precoder derived based on the estimated channel states.

Figure 8A:
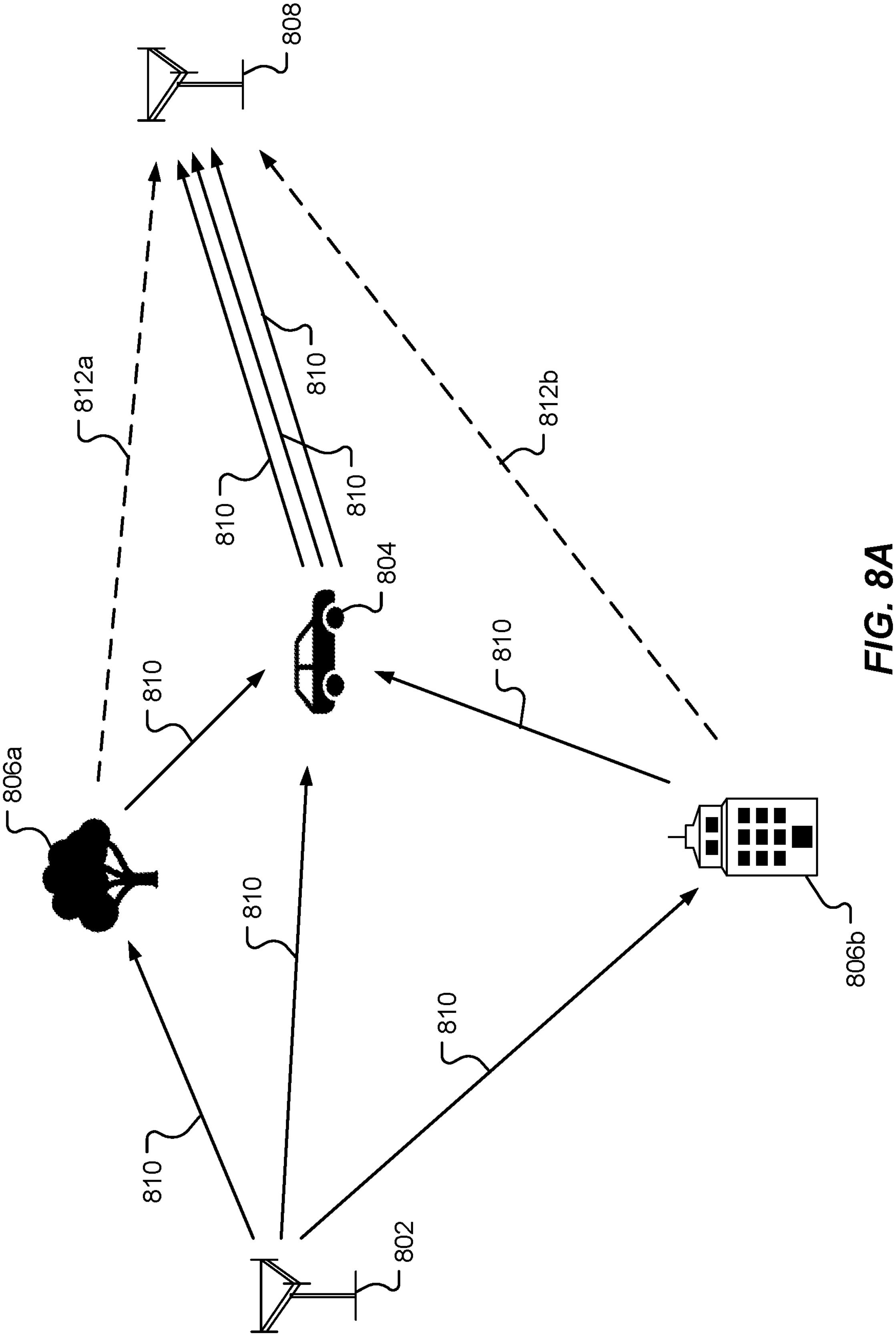
FIGS. 8A and 8B are conceptual diagrams of example bistatic RF sensing operations with a time reversed RF sensing signal.
Figure 8B:
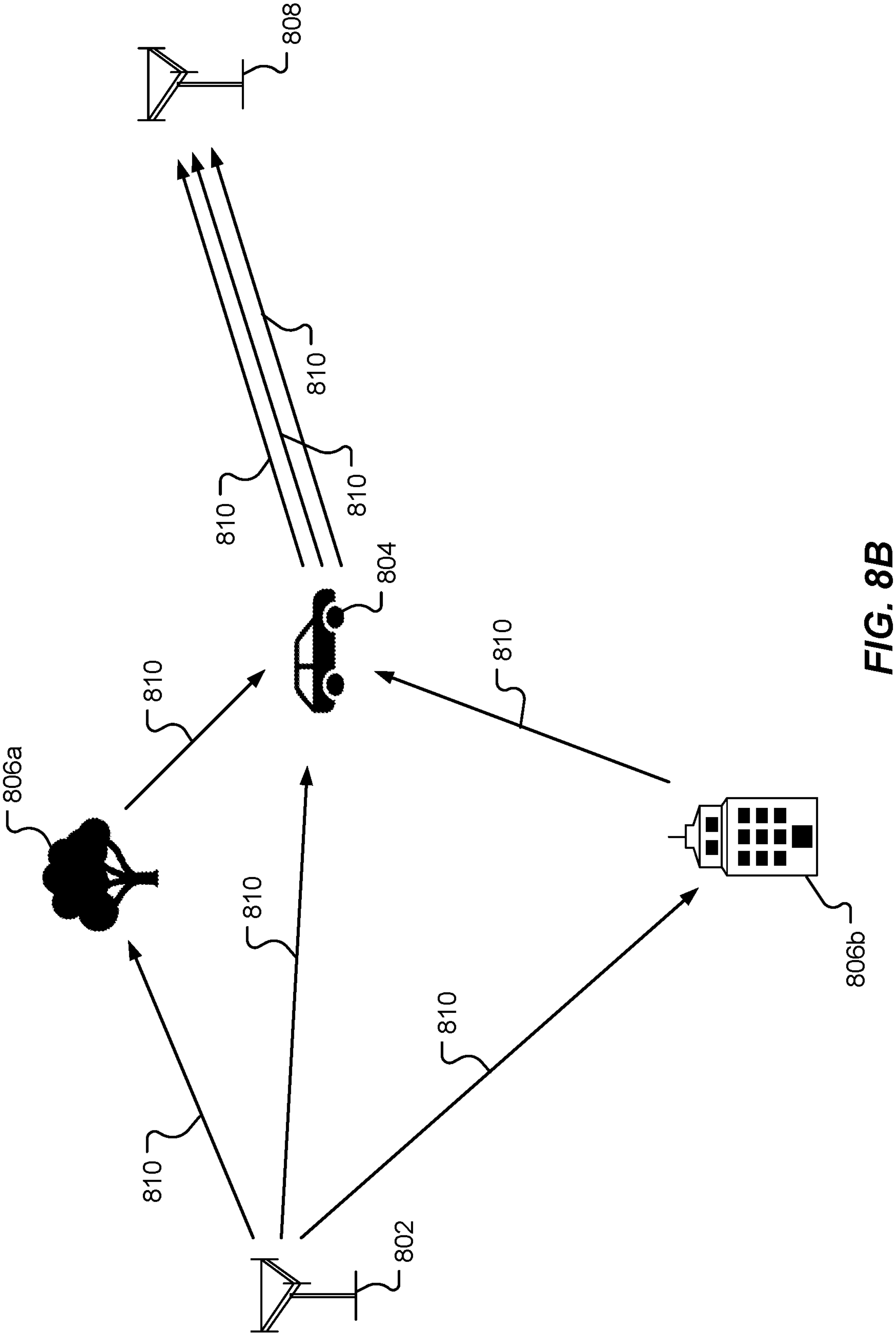

Referring to FIGS. 8A and 8B, conceptual diagrams of example bistatic RF sensing operations with a time reversed RF sensing signal are shown. A first wireless node, such as a first base station 802, may be configured to transmit a TR RF sensing signal 810. The TR RF sensing signal 810 may be based on a previously received RF sensing signal (i.e., as described in FIGS. 7A and 7B), or based on a TR filter (i.e., equation (1)). The TR RF sensing signal 810 may propagate over multiple paths and may be reflected by objects such as a vehicle 804, a tree 806*a* and a building 806*b*. A second wireless node, such as a second base station 808 (or UE or other mobile device), may be configured to receive the TR RF sensing signal 810 via the multiple paths. In operation, since the channel between the first and second base stations 802, 804 is known, the reflected paths between stationary objects such as the tree 806*a* and the building 806*b* are also known. In an example, the channel includes a first path 812*a* between the tree 806*a* and the second base station 808 and a second path 812*b* between the building 806*b* and the base station 808. The TR RF sensing signal is precoded based on the known channel (e.g., the CIR h(t) of the channel). As a result, referring to FIG. 8B, the received signal Y at the second base station is a compression of the multipath channel which increases the SNR of the RF sensing signal. For example, the signals received via the first and second path 812*b* may be reduced as compared to the signals received via the LOS path. The increase in SNR for a TR RF sensing signal may improve target detection performance for RF sensing operations. While FIGS. 8A and 8B depict two wireless nodes, additional wireless nodes may be configured to transmit and/or receive TR RF sensing signals for multistatic RF sensing operations.

In operation, the performance of time reversal based RF sensing is dependent on the channel reciprocity between wireless nodes (e.g., sensing nodes). Network entities, such as a sensing server (e.g., network entity 306), a gNB/TRP (e.g., base station 304), or mobile device (e.g., UE 302), may be configured to obtain channel information and determine the channel reciprocity between sensing nodes. TR RF sensing signals may be activated or deactivated based on the strength or weakness of the channel reciprocity. In an example. TR precoding implementation may also depend on the hardware capabilities and power budget of a sensing node. In an example, sensing nodes (e.g., UEs or gNBs) may be configured to report channel reciprocity information to one or more network entities (e.g., sensing server, gNB, other network entity). In an example, the channel reciprocity information may include channel reciprocity metrics such as SNR measurements. Higher SNR values may indicate stronger channel reciprocity. Low SNR variation may also be an indication of stronger channel reciprocity. The channel reciprocity metrics may include Doppler observations. For example, clutter Doppler signals are normally low power and may be associated with substantially fixed ranges (e.g., small movements about a fixed range). A sensing node may be configured to identify clutter objects and monitor the Doppler level of the clutter objects. Higher channel reciprocity levels may be associated with clutter Doppler which does not change over time.

In an example, machine learning (ML) techniques may be used for channel reciprocity prediction. A network entity (e.g., sensing server) may be configured to obtain channel measurement or CSI reports from sensing nodes, and then predict the channel reciprocity based on trained ML models. Training channel reciprocity prediction models may include obtaining uplink (UL) and downlink (DL) channel information from the sensing nodes.

Figure 9:
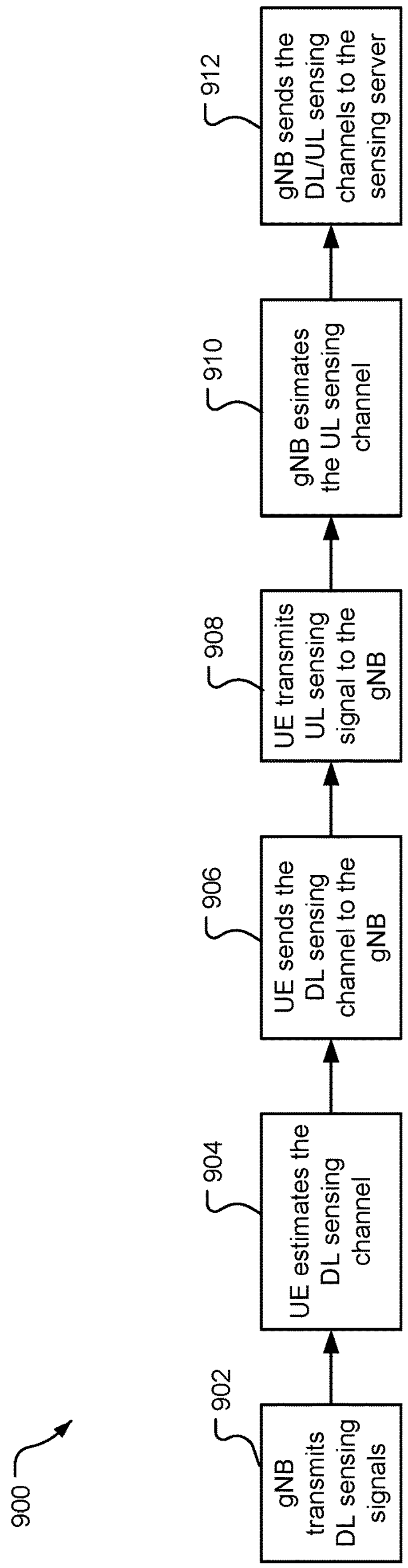
FIG. 9 is an example process for training a channel reciprocity prediction model.

Referring to FIG. 9, an example process 900 for training a channel reciprocity prediction model is shown. The process 900 includes obtaining sensing channels with two or more sensing nodes and providing the sensing channels to a network entity. The network entity may be configured to utilize the sensing channel information as training data for a ML channel reciprocity prediction model. In an example, the sensing nodes may include a UE (e.g., a UE 302) and a gNB (e.g., a base station 304), and the network entity may be a sensing server (e.g., a network entity 306). At stage 902, the gNB may be configured to transmit DL RF sensing signals. The DL RF sensing signals may be OFDM waveforms utilized by DL reference signals (RS). Examples of DL RS may include positioning reference signal (PRS), channel state information reference signal (CSI-RS), DMRS, primary synchronization signal (PSS), secondary synchronization signal (SSS), PTRS, etc. At stage 904, a UE may be configured to estimate the DL RF sensing channel. In an example, the UE may determine the channel impulse response (CIR) based on the transmitted DL RF sensing signal. At stage 906, the UE may be configured to send the DL RF sensing signal channel information (e.g., CIR information) to the gNB. At stage 908, the UE may transmit an UL RF sensing signal to the gNB. The RF sensing signal may be OFDM waveforms utilized by UL RF RS. Examples of UL RS may include sounding reference signal (SRS), demodulation reference signal (DMRS), phase tracking reference signal (PTRS), etc. At stage 910, the gNB may be configured to estimate the UL sensing channel. In an example, the gNB may be configured to determine the CIR based on the transmitted UL RF sensing signal. At stage 912, the gNB may be configured to send the UL and DL sensing channel information (e.g., the respective CIRs) to the sensing server. The sensing server may be configured to utilize the UL and DL sensing channel information as data sets in a ML module to predict channel reciprocity. For example, UL and DL sensing channels with reciprocity may be used to predict channel reciprocity based on a future input to a ML model of one of the UL or DL sensing channels. Other labels or data may also be used to train ML-based channel reciprocity prediction models.

In operation, object information associated with targets may be used to train a ML model. For example, labels such as a sensed object's trajectory may be used in the ML prediction to help it disambiguate from other moving objects. Some of the information of the labeled sensed object may be known or reported to the sensing server, such as the coarse location, speed, radar cross section (RCS), size, material, shape, etc. In an example, the labeled sensed objects may be known static objects in the environment, and an associated stable reflection from these labeled sensed objects. In an example, non-RF features may be used for the ML based channel reciprocity prediction. Such non-RF features may include time stamps of the RF sensing signals (e.g., day, morning, afternoon, hour, mins, second, etc.), and local weather conditions (e.g., temperature, precipitation, sky conditions (cloud cover), wind level, humidity, etc.). Other sensors may be configured to provide information for the ML based channel reciprocity prediction. For example, images generated by a camera at the gNB or UE may be analyzed and used in the ML model. Lidar scanning results and high-resolution location and map information (e.g., to identify local objects) may also be used to train the ML model.

In an embodiment, the sensing nodes may be configured to provide additional assistance information to aid the sensing server to generate TR precoding. In an example use case, a sensing node such as a UE may be associated with a specific sensing target (e.g., a drone associated with the same user as the UE). The UE may report a current location and the associated target to the sensing server. The sensing server may be configured to compare the sensing results and the device reported location, and then identify whether the sensing target is close to the device (e.g., the user). The range to the target may be used as a factor in determining the TR precoding periodicity. For example, if the sensing target is close to the user, the TR sensing signal may be transmitted with large/small periodicity or even turned off, based on the particular use case. A large periodicity may be utilized when the drone is in visual range (e.g., <20 m) and an RF sensing based range is less critical (e.g., because the operator can easily the drone-visual based flight). A shorter periodicity may be utilized when the drone is further away and the RF sensing based range is more critical because the operator is flying by remote input (e.g., instrument based flight).

Figure 10:
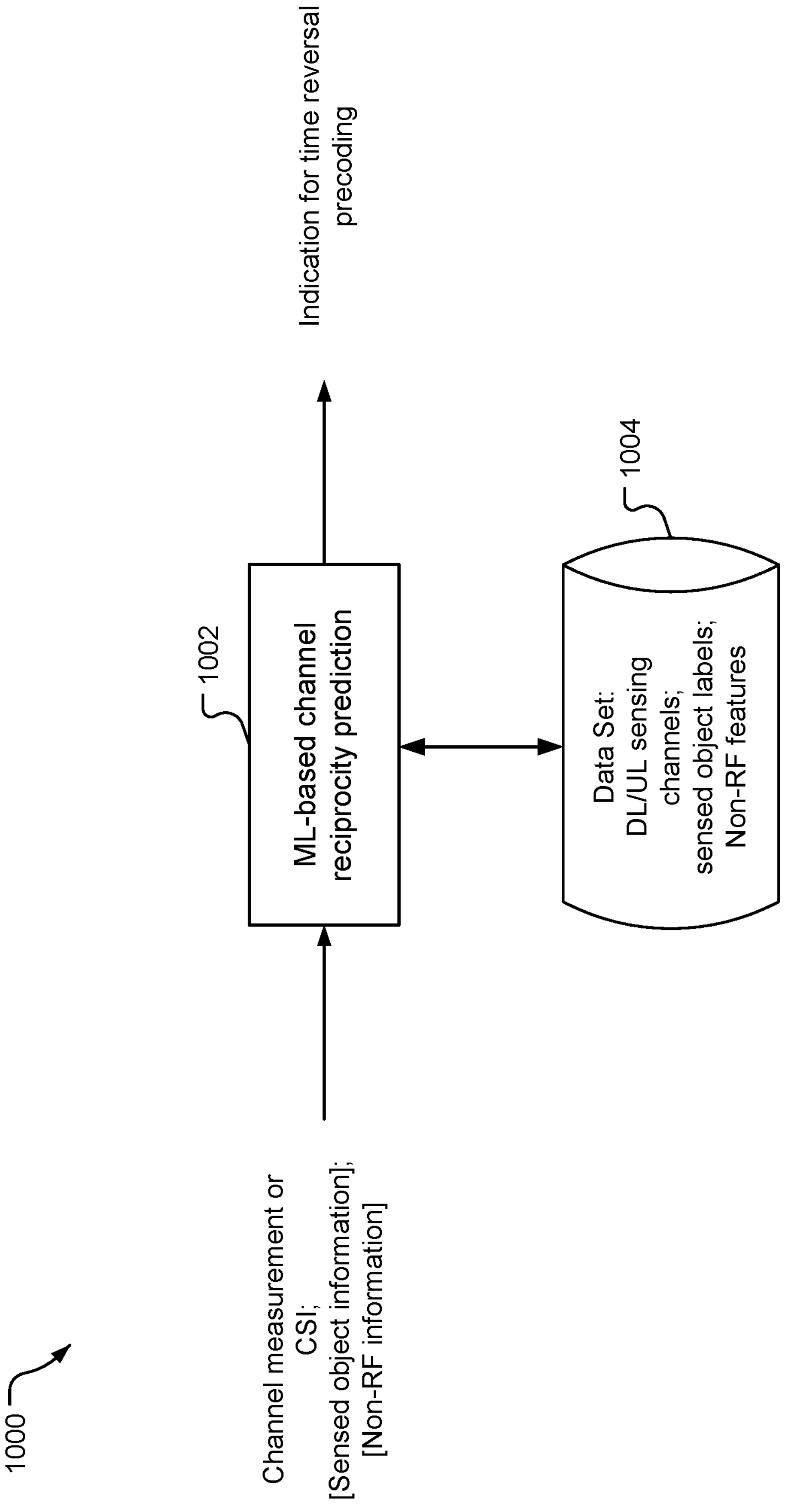
FIG. 10 is an example machine learning (ML) based channel reciprocity prediction module.

Referring to FIG. 10, an example machine learning (ML) based channel reciprocity prediction module 1000 is shown. A ML based channel reciprocity prediction model 1002 may be trained to learn relationships between DL and UL sensing channels to predict future channel reciprocity based on either DL or UL channel measurement or CSI input. Additional data may also be used with the model 1002. For example, a data set 1004 may also include sensed object information and non-RF features obtained by a sensing node. The sensed object information may be parameters associated with the object such as the coarse location, speed, radar cross section (RCS), size, material, shape, etc. The non-RF features may include time stamps of the RF sensing signals and environmental factors which may impact a channel (e.g., temperature, precipitation, sky conditions (cloud cover), wind level, humidity, etc.). Other non-RF information may be obtained with other sensors on a sensing node, such as a camera, an infra-red (IR) sensor, a lidar, a microphone (acoustic input), etc. The channel measurements, sensed object information, and non-RF information may be obtained by a sensing node and reported to a network entity (e.g., sensing server, gNB). These measurements may be added to the data set 1004 as training data that may be used to train (or re-train) the ML-based channel reciprocity prediction model. In an example, the size of the data set 1004 may be very large, and it may not be feasible to share the entire dataset with a mobile device, such as the UE 302. In some cases, rather than share the data set 1004, a more practical approach may be to train the channel reciprocity prediction model 1002 as a neural network (NN) using the data set 1004, and then share the neural network model and the parameters (e.g., weights and the like) for the trained model with the mobile device. The mobile device may then use the trained NN to predict channel reciprocity and obtain an indication for TR precoding based on channel measurements or CSI information. The sensed object information and non-RF information may also be used as inputs to the NN.

Such a machine learning model may be trained using various techniques to learn how to predict channel reciprocity and provide indications for TR precoding based on channel measurement or CSI information, and optionally, the sensed object and non-RF information. Given an input of a channel or CSI measurement reported to the network entity, the trained machine learning model may be configured to predict channel reciprocity and output an indication for TR precoding.

In an example, the channel reciprocity prediction model 1002 may be trained using supervised learning techniques in which an input data set of a plurality of DL and UL sensing channels may be used to train the machine learning model to recognize relationships based on a single channel or CSI measurement (and optional sensed object and non-RF information) and a predicted channel reciprocity. The model 1002 may be trained to output an indication for TR precoding. For example, if the predicted channel reciprocity is low; the indication for TR precoding may be to not utilize TR precoding.

The channel reciprocity prediction model 1002 may be trained offline and deployed to a sensing node for use in predicting channel reciprocity based on a channel measurement or CSI. If the predictions are consistently inaccurate by more than a threshold amount, the sensing node may be configured to determine that the model is inaccurate and may update the training data set using UL and DL channel information provided by a gNB (or other network entity). The sensing node may also be configured to request an updated (e.g., retrained machine learning model) from a network entity (e.g., sensing server).

The channel reciprocity prediction model 1002 may be based on other machine learning algorithms and training methods. For example, supervised learning algorithms, unsupervised learning algorithms, reinforcement learning algorithms, deep learning algorithms, artificial neural network algorithms, or other type of machine learning algorithms may be used. For example, the machine learning may be performed using a deep convolutional network (DCN). DCNs are networks of convolutional networks, configured with additional pooling and normalization layers. DCNs have achieved state-of-the-art performance on many tasks. DCNs may be trained using supervised learning in which both the input and output targets are known for many examples and are used to modify the weights of the network by use of gradient descent methods. DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

In an example, the machine learning may be performed using a neural network. Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

In an example, different types of artificial neural networks may be used to implement machine learning, such as recurrent neural networks (RNNs), multilayer perceptron (MLP) neural networks, convolutional neural networks (CNNs), and the like. RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label. Convolutional neural networks (CNNs) are a type of feed-forward artificial neural network. Convolutional neural networks may include collections of artificial neurons that each has a receptive field (e.g., a spatially localized region of an input space) and that collectively tile an input space. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

Aspects of the present disclosure provide techniques for predicting channel reciprocity and an indication for TR precoding using machine learning models and qualifying channel reciprocity predictions made using machine learning models. The techniques may be used, for example, to allow for the use of channel reciprocity predictions for transmissions between a network entity (e.g., a gNB, a sensing server) and a UE, and may result in more efficient use of wireless communications resources, improved reliability for communications between the network entity and the UE.

Figure 11:
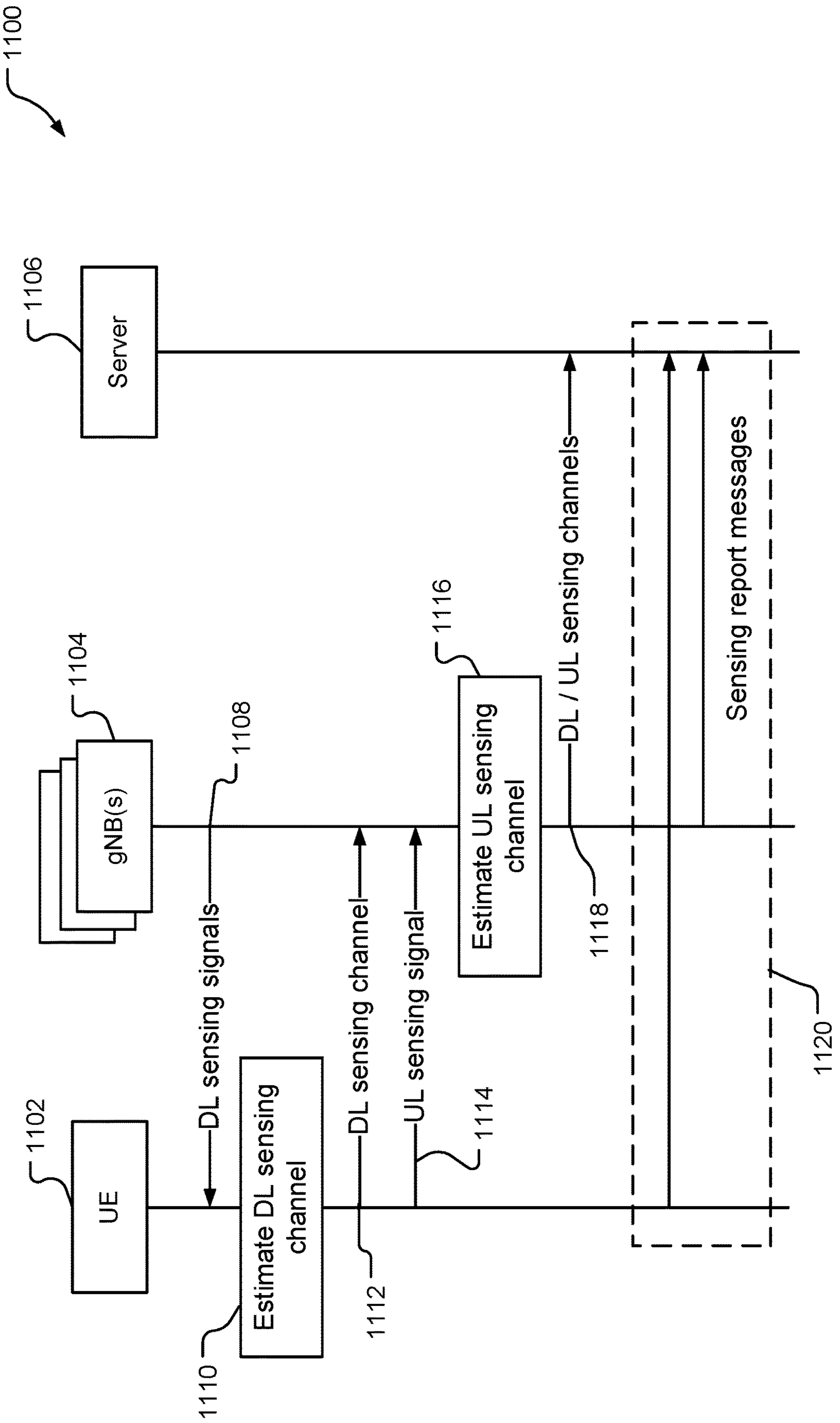
FIG. 11 is an example message flow diagram for obtaining RF sensing channel information.

Referring to FIG. 11, an example message flow: 1100 for obtaining RF sensing channel information is shown. The message flow 1100 includes a UE 1102, one or more gNB(s), such as the gNB 1104, and a sensing server 1106. The UE 1102 may have some or all of the components of the UE 302, and the UE 302 may be an example of the UE 1102. The gNB 1104 may have some or all of the components of the base station 304, and the base station 304 may be an example of the gNB 1104. The sensing server 1106 may have some or all of the components of the network entity 306, and the network entity 306 may be an example of the sensing server 1106. While the message flow 1100 depicts message flows between one UE and one gNB, the message flow: 1100 may be utilized with different combinations of UEs and gNBs since each UL and DL channel between different combinations of stations may also be different.

In operation, the message flow 1100 may be implemented to obtain UL and DL channel information to train the channel reciprocity prediction model 1002. For example, the gNB 1104 may be configured to transmit DL RF sensing signals 1108. The DL RF sensing signals 1108 may include PRS, CSI-RS, DMRS, PSS, SSS, PTRS, or other reference signal waveforms which may be used to obtain a channel estimate. At stage 1110, the UE 1102 may be configured to estimate a DL RF sensing channel based on the DL sensing signals 1108. In an example, the UE 1102 may determine the channel impulse response (CIR) based on the transmitted DL RF sensing signal 1108. The UE 1102 may also be configured to obtain one or more channel reciprocity metrics based on the DL sensing signals 1108. For example, the channel reciprocity metrics may include SNR measurements and Doppler observations. Other sensed object and non-RF information may be obtained by the UE 1102.

The UE 1102 may be configured to send one or more DL sensing channel messages 1112 containing the DL channel information determined at stage 1110 (e.g., CIR information) to the gNB 1104. The channel reciprocity metrics, sensed object and non-RF information may also be included in the DL sensing channel messages 1112. The UE 1102 may also transmit an UL sensing signal 1114 to the gNB 1104. The UL sensing signal 1114 may be SRS, DMRS, PTRS, or other reference signal waveforms which may be used to obtain a channel estimate. At stage 1116, the gNB 1104 may be configured to estimate the UL sensing channel. In an example, the gNB 1104 may be configured to determine the CIR based on the transmitted UL sensing signal 1114. The gNB 1104 may also be configured to obtain one or more channel reciprocity metrics based on the UL sensing signals 1114. For example, the channel reciprocity metrics may include SNR measurements and Doppler observations. Other sensed object and non-RF information may be obtained by the gNB 1104. The gNB 1104 may be configured to send one or more DL/UL sensing channel information messages 1118 to the sensing server 1106, including UL and DL sensing channel information such as the respective CIRs determined at stages 1110 and 1116. The respective channel reciprocity metrics, sensed object and non-RF information obtained by the UE 1102 and the gNB 1104 may be included in the DL/UL sensing channel information messages 1118. The sensing server 1106 may be configured to utilize the UL and DL sensing channel information, the sensed object information, and the non-RF information in the data set 1004 in the ML based channel reciprocity prediction module 1000. In an example, at stage 1120, the UE 1102 and the gNB 1104 may be configured to provide sensing report messages to the sensing server 1106. The sensing report messages may include sensed object and non-RF information and other information based on RF sensing operations performed by the UE 1102 and gNB 1104. In an example, implementation feedback for the ML module 1000, such as the actual channel reciprocity as compared to the modeled channel reciprocity may be included in the sensing reporting messages.

Figure 12:
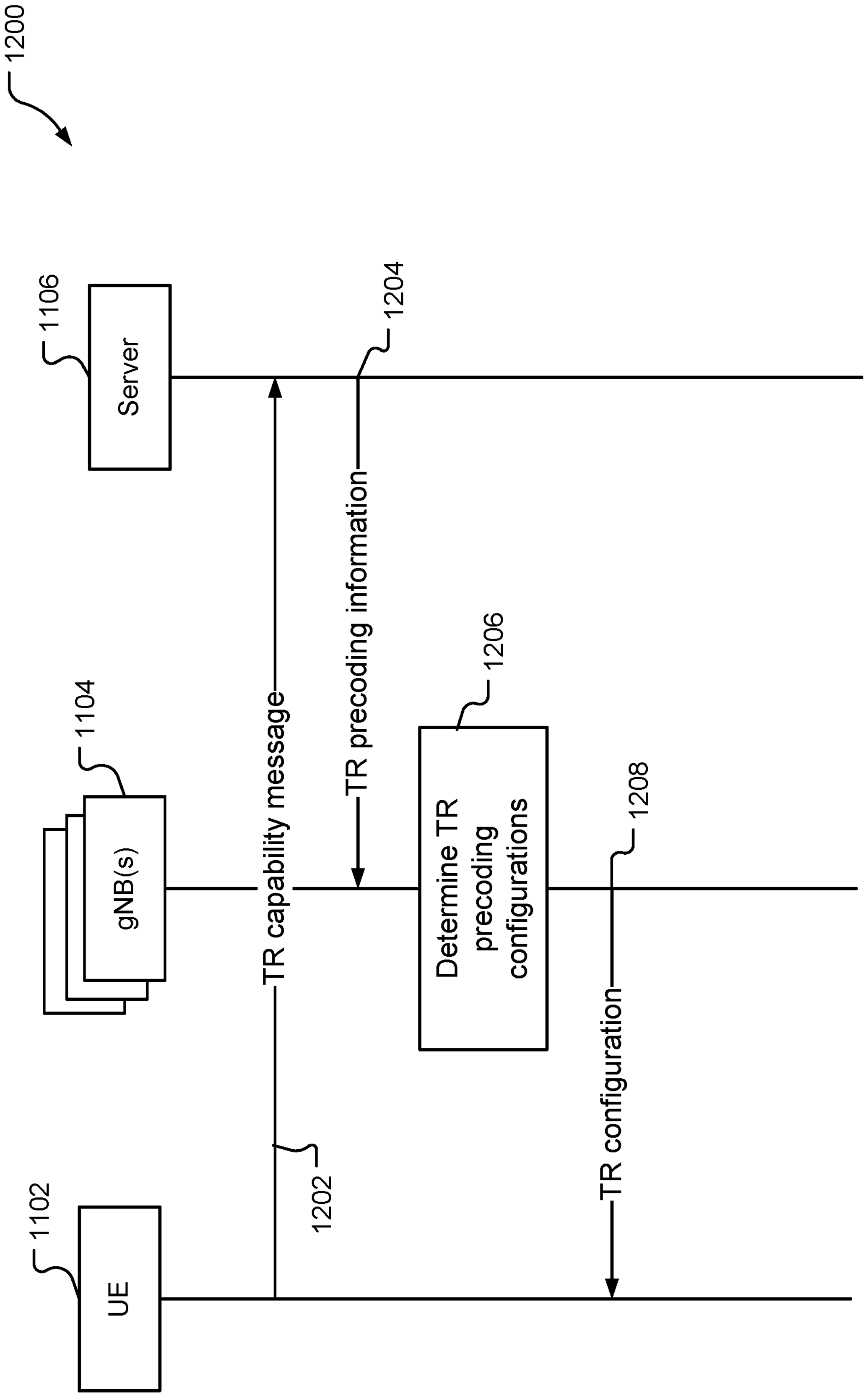
FIG. 12 is an example message flow diagram for configuring time reversal precoding for RF sensing.

Referring to FIG. 12, an example message flow 1200 for configuring TR precoding for RF sensing is shown. The message flow includes the example UE 1102, gNB 1104 and sensing server 1106 described in FIG. 11. The UE 1102 may be configured to provide one or more TR capability messages 1202 as part of a RF sensing session, or as part of a request to initiate an RF sensing session. The TR capability messages 1202 may include information describing the ability of the UE 1102 to perform TR RF sensing operations. For example, the capability of the UE 1102 to utilize TR precoding for RF sensing signals may be limited based on hardware or software precoding capability or buffering capability (e.g., for direct time reversal). The precoding capability may be whether the UE 1102 is configured to support per sub band-based precoding or only wide-band precoding. The capabilities may be based on a hardware RF calibration capability to maintain channel reciprocity. For example, the channel reciprocity in the RF hardware chains (e.g., DL chain vs UL chain) may require calibration capability at the sensing node to support TR precoding. The UE 1102 and the gNB 1104 may need to calibrate its DL/UL RF hardware chains to maintain DL and UL channel reciprocity. In an example, the gNB 1104 may be configured to provide capability information to the sensing server 1106.

The sensing server 1106 is configured to receive channel reciprocity information from sensing nodes and provide TR precoding information to sensing nodes. For example, the sensing server 1106 may receive DL and/or UL sensing channel information (e.g., via the DL/UL sensing channel information messages 1118 or other signaling), and then instruct sensing nodes to activate or deactivate TR precoding based on the channel reciprocity for the respective sensing nodes. The sensing server 1106 may provide on-demand requests to indicate that one or more sensing nodes should activate or deactivate TR precoding. For example, when the sensing server 1106 determines that the channel reciprocity is weak (e.g., based on received channel indications and/or outputs from a ML model), the sensing server 1106 may be configured to signal an early TR precoding cancelation to the sensing nodes. Conversely, when the sensing server determines that the channel reciprocity is strong, the sensing server 1106 may signal a TR precoding resume command. The commands to activate or deactivate TR precoding may be included in one or more TR precoding information messages 1204. In an example, the TR precoding information messages 1204 may include an on-demand request to activate or deactivate TR precoding for one or more sensing nodes. In an example, the sensing server 1106 may configure TR precoding with a first TR precoding information message, and then subsequently deactivate (e.g., suspend, cancel, etc.) the TR precoding with a second TR precoding information message. In an example, the sensing server 1106 may be configured to indicate some areas with higher channel reciprocity, which could enable zone-based TR precoding. The sensing nodes (e.g., UEs, gNBs) in the indicated areas may receive a request to activate or deactivate TR precoding for RF sensing based on the TR precoding information messages 1204. The areas may be defined based on two-dimensional or three-dimensional geographic locations. The TR precoding information may be based on the TR capability messages 1202.

At stage 1206, the gNB 1104 (or other sensing node receiving the TR precoding information messages 1204) may be configured to determine precoding configurations based on the TR precoding information provided by the sensing server 1106. For example, sensing nodes in one area may be configured to utilize TR precoding and sensing nodes in another area may be configured to suspend the use of TR precoding. The gNB 1104 may be configured to provide TR configuration information 1208 to sensing nodes in the areas via over-the-air signaling techniques such as Radio Resource Control (RRC) messages. For example, TR precoding configuration information may be included in one or more System Information Blocks (SIBs) transmitted from the gNB 1104. Other signaling techniques may also be used. In an example, lower level signaling such a Downlink Control Information (DCI) and Medium Access Control signaling may be used to signal the UE 1102 to activate or deactivate TR precoding. DCI and MAC Control Elements (CE) may be configured as low latency techniques to instruct the UE 1102 to turn TR precoding on or off.

Figure 13:
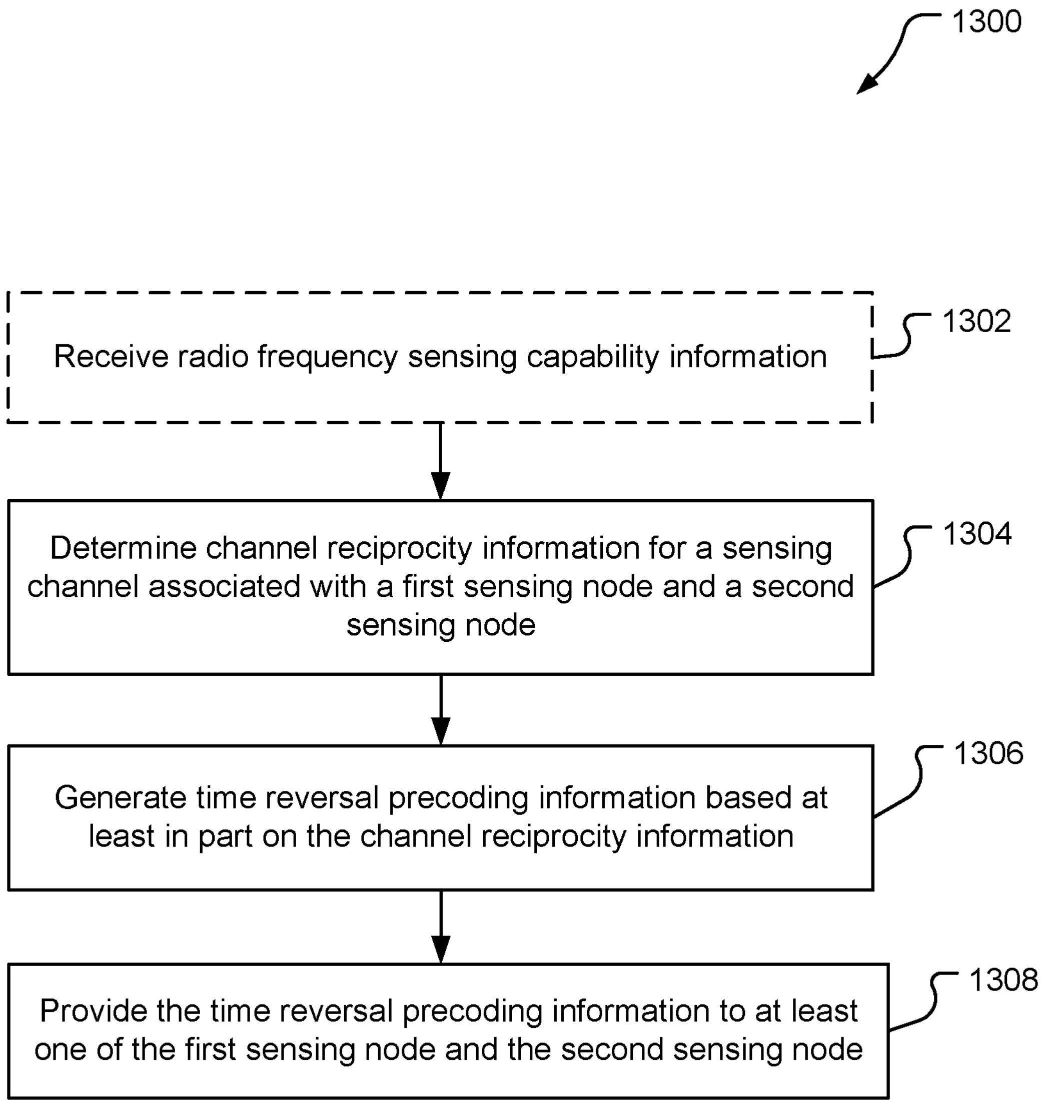
FIG. 13 is an example process flow diagram of a method for generating time reversal precoding information for RF sensing operations.

Referring to FIG. 13, with further reference to FIGS. 1-12, a method 1300 for generating time reversal precoding information for radio frequency sensing operations includes the stages shown. A network entity 306, such as the sensing server 1106, or other wireless nodes described herein, may be configured to generate TR precoding information. The method 1300 is, however, an example and not limiting. The method 1300 may be altered, e.g., by having stages added, removed, rearranged, combined, performed concurrently, and/or having single stages split into multiple stages. For example, receiving RF sensing capability information at stage 1302 is optional.

At stage 1302, the method optionally includes receiving radio frequency sensing capability information. A network entity 306, including the processing system 394 and the network interface 390, is a means for receiving RF sensing capability information. Other wireless nodes, such as the base station 304 may also be a means for receiving RF sensing capability information. A sensing node, such as the UE 1102 and/or the gNB 1104, may be configured to provide one or more TR capability messages 1202 including information describing the ability of the UE 1102 and/or the gNB 1104 to perform TR RF sensing operations. The capability of a sensing node to utilize TR precoding for RF sensing signals may be limited based on hardware or software precoding capability or buffering capability (e.g., for direct time reversal). The precoding capability may be whether the sensing node is configured to support per sub band-based precoding or only wide-band precoding. The capabilities may be based on a hardware RF calibration capability to maintain channel reciprocity. The sensing server 1106 may be configured to utilize the capabilities of a sensing node to generate TR precoding information.

At stage 1304, the method includes determining channel reciprocity information for a sensing channel associated with a first sensing node and a second sensing node. The network entity 306, including the processing system 394 and the network interface 390, is a means for determining channel reciprocity information. Other wireless nodes, such as the base station 304 may also be a means for determining channel reciprocity information. In an example, a sensing node may provide channel reciprocity information such as channel reciprocity metrics (e.g., SNR measurements, Doppler observations) and/or channel state information (e.g., CIR) associated with a channel utilized by the first and second sensing nodes. In an example, the first sensing node is the UE 1102 and the second sensing node is the gNB 1104. The gNB 1104 may be configured to provide channel information via one or more DL/UL sensing channel information messages 1118. In an example, the sensing server 1106 may be configured to determine the channel reciprocity information based on an output of the ML based channel reciprocity prediction module 1000. For example, the UE 1102 and/or gNB 1104 may be configured to provide channel measurements (e.g., CIR, channel reciprocity metrics) to the sensing server 1106, and the sensing server 1106 may utilize the ML based channel reciprocity prediction module 1000 to determine the channel reciprocity information. Additional information received from the sensing nodes (e.g., sensed object and non-RF information) may be used to determine the channel reciprocity information.

At stage 1306, the method includes generating time reversal precoding information based at least in part on the channel reciprocity information. The network entity 306, including the processing system 394 and the network interface 390, is a means for generating TR precoding information. Other wireless nodes, such as the base station 304 may also be a means for generating TR precoding information. The TR precoding information may include an indication to activate or deactivate TR precoding for RF sensing based on the channel reciprocity. For example, if the channel reciprocity is low; then generating the TR precoding information includes generating an indication for one or more sensing nodes to deactivate TR precoding. Conversely, if the channel reciprocity is high, then generating the TR precoding information includes generating an indication for one or more sensing nodes to activate TR precoding. In an example, the sensing server 1106 may be configured to indicate some areas with higher channel reciprocity, which could enable zone-based TR precoding. The first and second sensing nodes may be instructed to activate or deactivate TR precoding based on their respective locations.

At stage 1308, the method includes providing the time reversed precoding information to at least one of the first sensing node and the second sensing node. The network entity 306, including the processing system 394 and the network interface 390, is a means for providing TR precoding information. Other wireless nodes, such as the base station 304 may also be a means for providing the TR precoding information. The sensing server 1106 may be configured to provide on-demand requests based on the TR precoding information generated at stage 1306. For example, if the TR precoding information indicates that the channel reciprocity is weak (e.g., based on received channel indications and/or outputs from a ML model), then the sensing server 1106 may be configured to signal an early TR precoding cancelation to the sensing nodes. The TR precoding information may be commands to activate or deactivate TR precoding and may be included in one or more TR precoding information messages 1204. The TR precoding information may include on-demand requests to activate or deactivate TR precoding for the first or second sensing nodes. The TR precoding information may be provided to the sensing nodes via over-the-air signaling techniques such as RRC, DCI, and MAC-CE. Other signaling may also be used to instruct a sensing node to activate or deactivate TR precoding.

Figure 14:
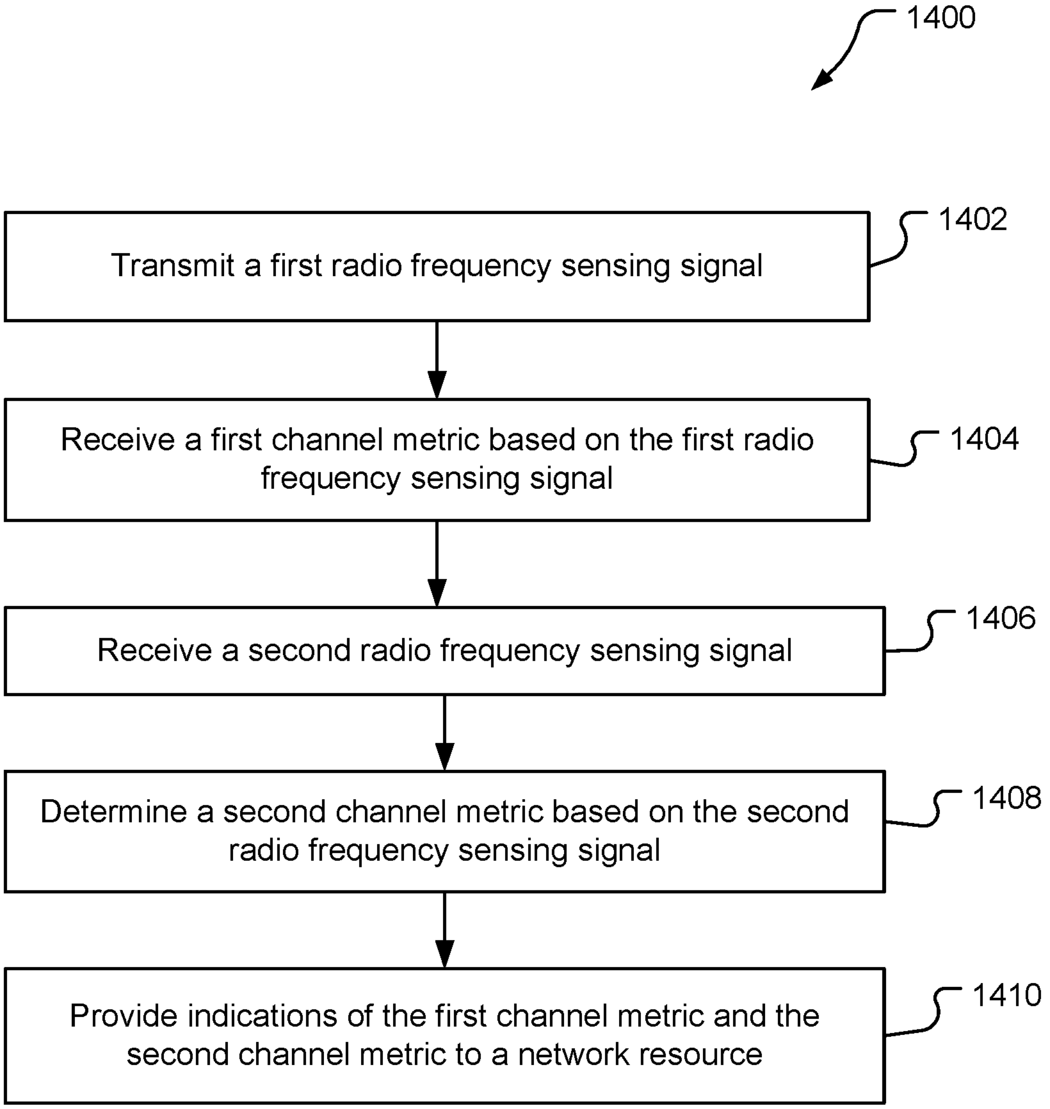
FIG. 14 is an example process flow diagram of a method for training a channel reciprocity prediction model.

Referring to FIG. 14, with further reference to FIGS. 1-12, a method 1400 for training a channel reciprocity prediction model includes the stages shown. A sensing node, such as a gNB or UE, may be configured to provide channel information for training a channel reciprocity prediction model. The method 1400 may utilize different over-the-air signaling described as uplink and down link reference signals. In an example, sidelink signals (e.g., between UEs and/or other reference location devices) may also be used to obtain channel reciprocity information. The method 1400 is, however, an example and not limiting. The method 1400 may be altered, e.g., by having stages added, removed, rearranged, combined, performed concurrently, and/or having single stages split into multiple stages.

At stage 1402, the method includes transmitting a first radio frequency sensing signal. A base station 304, including the processing system 384 and the transceiver 350, is a means for transmitting the first RF sensing signal. Other sensing nodes, such as a UE 302, may be a means for transmitting the first RF sensing signal. A base station 304, such as the gNB 1104 may be configured to transmit one or more DL RF sensing signals 1108 as the first RF sensing signal. The first RF sensing signal may be an OFDM waveform utilized as a reference signal (RS), such as PRS, CSI-RS, DMRS, PSS, SSS, PTRS, etc. When received by another sensing node, the first RF sensing signal will enable the sensing node (e.g., the UE 1102) to obtain channel information. For example, the sensing mode may be configured to determine a CIR based on the first RF sensing signal. Other channel reciprocity metrics such as the SNR and/or Doppler observations associated with the received first RF sensing signal may be determined. Sensed object labels may also be determined based at least in part on the first RF sensing signal (e.g., as reflected off target objects).

At stage 1404, the method includes receiving a first channel metric based on the first radio frequency sensing signal. The base station 304, including the processing system 384 and the transceiver 350, is a means for receiving the first channel metric. Other sensing nodes, such as a UE 302, may be a means for receiving the first channel metric. In general, the first channel metric includes data for training the ML based channel reciprocity prediction model 1002. In an example, referring to FIG. 11, a sensing node such as the UE 1102 may be configured to obtain channel information such as the CIR and/or other channel reciprocity metrics (e.g., SNR, Doppler) at stage 1110, and then transmit some or all of the channel information as the first channel metric. The first channel metric may include sensed object information and/or non-RF feature information which may also be used for training the ML based channel reciprocity prediction model 1002.

At stage 1406, the method includes receiving a second radio frequency sensing signal. The base station 304, including the processing system 384 and the transceiver 350, is a means for receiving the second RF sensing signal. Other sensing nodes, such as a UE 302, may be a means for receiving the second RF sensing signal. In an example, the UE 1102 may be configured to transmit a RF sensing signal in response to receiving the first RF sensing signal to enable the gNB 1104 to obtain channel information. In an example, the second RF sensing signal may be a UL RS or other OFDM waveform. A network entity, such as a sensing server, may be configured to provide resource information to enable the sensing node to configure the RF sensing signals.

At stage 1408, the method includes determining a second channel metric based on the second radio frequency sensing signal. The base station 304, including the processing system 384 and the transceiver 350, is a means for determining the second channel metric. Other sensing nodes, such as a UE 302, may be a means for determining the second channel metric. The second channel metric may also include data for training the ML based channel reciprocity prediction model 1002. In an example, referring to FIG. 11, the gNB 1104 may be configured to obtain channel information such as the CIR and/or other channel reciprocity metrics (e.g., SNR, Doppler) at stage 1116 based on the received UL sensing signal 1114. The second channel metric may include sensed object information and/or non-RF feature information which may also be used for training the ML based channel reciprocity prediction model 1002.

At stage 1410, the method includes providing indications of the first channel metric and the second channel metric to a network entity. The base station 304, including the processing system 384 and the transceiver 350, is a means for providing the indications of the first and second channel metrics. Other sensing nodes, such as a UE 302, may be a means for providing the indications. In an example, the gNB 1104 may be configured to send one or more DL/UL sensing channel information messages 1118 to the network entity such as the sensing server 1106. The DL/UL sensing channel information messages may include indications of UL and DL sensing channel information. For example, the first and second channel metrics may include one or more of the respective CIRs, the respective channel reciprocity metrics, as well as sensed object and non-RF information obtained by the UE 1102 and the gNB 1104. The sensing server 1106 may be configured to store the first and second channel metrics in the data set 1004 in the ML based channel reciprocity prediction module 1000.

Figure 15:
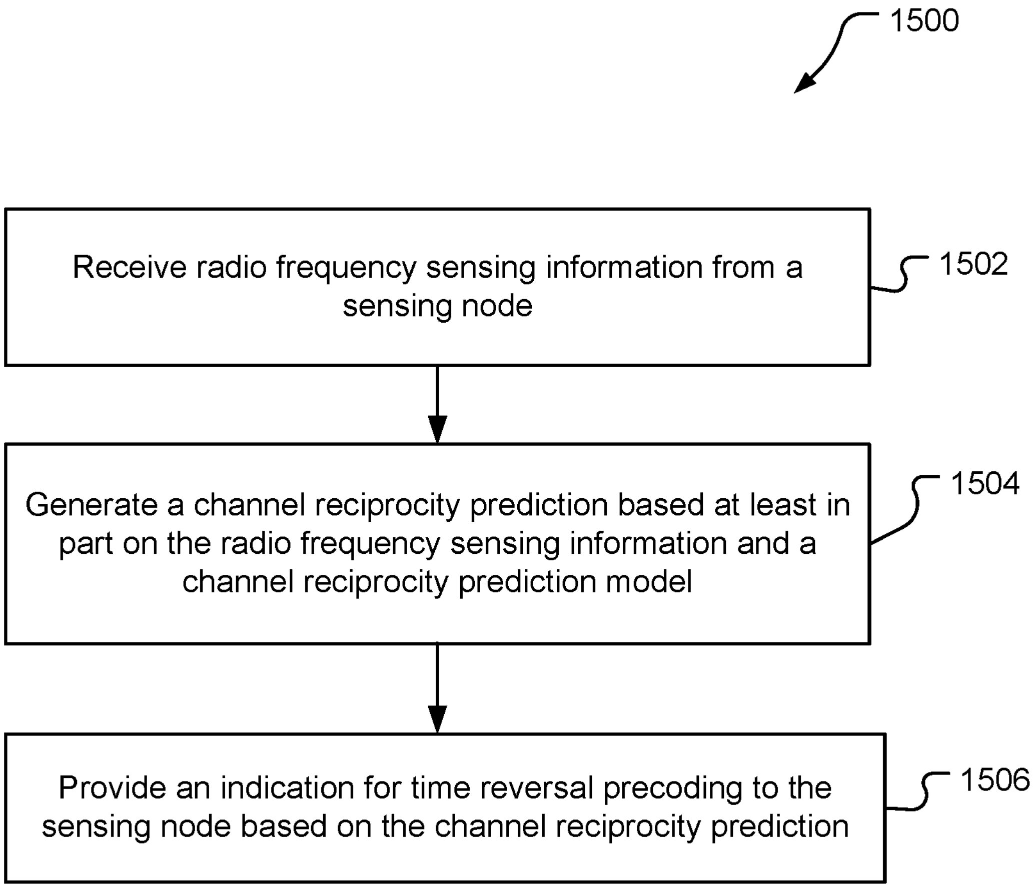
FIG. 15 is an example process flow diagram of a method for generating channel reciprocity prediction information for RF sensing operations.

Referring to FIG. 15, with further reference to FIGS. 1-12, a method 1500 for generating channel reciprocity prediction information for RF sensing operations includes the stages shown. A network entity, such as a sensing server 1106, may be configured to generate channel reciprocity prediction information. Other network entities, such as gNBs and UEs may also be configured to implement the method 1500. In an example, sidelink signals (e.g., between UEs and/or other reference location devices) may also be used to obtain channel reciprocity information from a network entity. The method 1500 is, however, an example and not limiting. The method 1500 may be altered, e.g., by having stages added, removed, rearranged, combined, performed concurrently, and/or having single stages split into multiple stages.

At stage 1502, the method includes receiving radio frequency sensing information from a sensing node. A network entity 306, such as the sensing server 1106, including the processing system 394 and the network interface 390, is a means for receiving the RF sensing information. Other network entities, such as a gNB or a UE, may also be a means for receiving the RF sensing information. In an example, a sensing node may be configured to determine channel information for a RF sensing channel. The channel information may include a measured or estimated CIR result and/or other channel reciprocity metrics such as SNR or Doppler information associated with a reference signal. In an example, the RF sensing information may include sensed object information and other non-RF information. The sensing node may provide the RF sensing information to the sensing server in an effort to receive channel reciprocity information and/or TR precoding information from the network. The RF sensing information may include one or more input parameters for the ML based channel reciprocity prediction module 1000.

At stage 1504, the method includes generating a channel reciprocity prediction based at least in part on the radio frequency sensing information and a channel reciprocity prediction model. The network entity 306, including the processing system 394 and the network interface 390, is a means for generating the channel reciprocity prediction. Other network entities, such as a gNB or a UE, may also be a means for channel reciprocity information. In an example, the sensing server may be communicatively coupled to the ML based channel reciprocity prediction module 1000. The ML based channel reciprocity prediction model 1002 may be trained using various techniques to learn how to predict channel reciprocity and provide indications for TR precoding based on the RF sensing information provided at stage 1502. The RF sensing information may include channel measurement or CSI information, and optionally, the sensed object and non-RF information. Given an input of a channel or CSI measurement reported to the network entity, the trained channel reciprocity prediction model 1002 may be configured generate to the channel reciprocity prediction and output associated indications for TR precoding.

At stage 1506, the method includes providing an indication for time reversal precoding to the sensing node based on the channel reciprocity prediction. The network entity 306, including the processing system 394 and the network interface 390, is a means for providing the indication for TR precoding. Other network entities, such as a gNB or a UE, may also be a means for providing indications for TR precoding. For example, NN models may be provided to sensing nodes and the sensing node may be configured to provide an indication for TR precoding without utilizing a network entity. The sensing server may be configured to utilize the channel reciprocity prediction generated at stage 1504 to instruct sensing nodes to activate or deactivate TR precoding. Channels with low reciprocity may deactivate TR precoding to reduce processing cycles and preserve battery power. The sensing server may be configured to provide the indication of the TR precoding in on-demand requests to indicate that the sensing node should activate or deactivate TR precoding. In an example, the indication for TR precoding may be included in one or more TR precoding information messages 1204. In an example, the sensing server may be configured to receive the RF sensing information from a first sensing node (e.g., a UE) and then provide the indication for TR precoding to a second sensing node (e.g., a gNB serving the UE). The gNB may then be configured to provide the indication for TR precoding to the UE. For example, DCI and MAC-CE signaling techniques may be used to provide the indication for TR precoding to the UE, and the UE may be configured to activate or deactivate the TR precoding for RF sensing signals based on the indication.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

Implementation examples are described in the following numbered clauses:

Clause 1. A method for generating time reversal precoding information for radio frequency sensing operations, comprising: determining channel reciprocity information for a sensing channel associated with a first sensing node and a second sensing node: generating time reversal precoding information based at least in part on the channel reciprocity information; and providing the time reversal precoding information to at least one of the first sensing node and the second sensing node.

Clause 2. The method of clause 1, wherein the time reversal precoding information includes a time reversed filter based on a reversed channel impulse response for the sensing channel.

Clause 3. The method of clause 1, wherein the time reversal precoding information includes an indication to activate or deactivate time reversal precoding on at least one of the first sensing node and the second sensing node.

Clause 4. The method of clause 1, wherein the channel reciprocity information comprises a channel impulse response for the sensing channel.

Clause 5. The method of clause 1, wherein the channel reciprocity information comprises one or more channel reciprocity metrics including a signal to noise ratio for a reference signal transmitted with the sensing channel, and/or a Doppler observation associated with a sensing signal transmitted with the sensing channel.

Clause 6. The method of clause 1, further comprising receiving radio frequency sensing capability information, wherein generating the time reversal precoding information is based at least in part on the radio frequency sensing capability information.

Clause 7. The method of clause 1, wherein generating the time reversal precoding information includes providing the channel reciprocity information as an input to a machine learning module and receiving the time reversal precoding information as an output of the machine learning module.

Clause 8. The method of clause 1, wherein the first sensing node is a user equipment and the second sensing node is a base station.

Clause 9. The method of clause 1, wherein the time reversal precoding information is associated with a location of the first sensing node and/or the second sensing node.

Clause 10. A method for training a channel reciprocity prediction model, comprising: transmitting a first radio frequency sensing signal: receiving a first channel metric based on the first radio frequency sensing signal: receiving a second radio frequency sensing signal: determining a second channel metric based on the second radio frequency sensing signal; and providing indications of the first channel metric and the second channel metric to a network entity.

Clause 11. The method of clause 10, wherein the first radio frequency sensing signal is a downlink reference signal comprising at least one of a positioning reference signal (PRS), a channel state information reference signal (CSI-RS), a primary synchronization signal (PSS), and/or a secondary synchronization signal (SSS).

Clause 12. The method of clause 10, wherein the second radio frequency sensing signal is an uplink reference signal comprising at least one of a sounding reference signal (SRS), a demodulation reference signal (DMRS), and/or a phase tracking reference signal (PTRS).

Clause 13. The method of clause 10, wherein the first channel metric comprises a first channel impulse response associated with the first radio frequency sensing signal.

Clause 14. The method of clause 13, wherein the second channel metric comprises a second channel impulse response associated with the second radio frequency sensing signal.

Clause 15. The method of clause 10, wherein the first channel metric comprises one or more channel reciprocity metrics including a signal to noise ratio and/or a Doppler observation associated with the first radio frequency sensing signal.

Clause 16. The method of clause 10, wherein the first channel metric comprises one or more non-radio frequency features including a time stamp, an indication of a weather condition, and/or information obtained from a sensor associated with a sensing node.

Clause 17. The method of clause 10, wherein the second channel metric comprises one or more channel reciprocity metrics including a signal to noise ratio and/or a Doppler observation associated with the second radio frequency sensing signal.

Clause 18. The method of clause 10, wherein the network entity is a sensing server.

Clause 19. The method of clause 10, further comprising receiving an indication of time reversal precoding from the network entity.

Clause 20. A method for generating channel reciprocity information for radio frequency sensing operations, comprising: receiving radio frequency sensing information from a sensing node: generating a channel reciprocity prediction based at least in part on the radio frequency sensing information and a channel reciprocity prediction model; and providing an indication for time reversal precoding to the sensing node based on the channel reciprocity prediction.

Clause 21. The method of clause 20, wherein the indication for time reversal precoding includes a time reversed filter based on reversing channel impulse response information received from the sensing node.

Clause 22. The method of clause 20, wherein the indication for time reversal precoding includes an indication to activate and/or deactivate time reversal precoding on the sensing node.

Clause 23. The method of clause 20, wherein the radio frequency sensing information includes a channel impulse response obtained by the sensing node.

Clause 24. The method of clause 20, wherein the radio frequency sensing information comprises one or more channel reciprocity metrics including a signal to noise ratio for a reference signal received by the sensing node, and/or a Doppler observation associated with a sensing signal received by the sensing node.

Clause 25. The method of clause 20, further comprising receiving radio frequency sensing capability information associated with the sensing node, wherein generating the indication for time reversal precoding is based at least in part on the radio frequency sensing capability information.

Clause 26. The method of clause 20, wherein the sensing node is a user equipment, and providing the indication for time reversal precoding includes signaling the user equipment via at least one of a downlink control information message, a medium access control message, and a radio resource control message.

Clause 27. The method of clause 20, wherein the indication for time reversal precoding is associated with a location of the sensing node.

Clause 28. The method of clause 20, wherein generating the channel reciprocity prediction includes providing the radio frequency sensing information to a network entity and receiving the channel reciprocity prediction from the network entity.

Clause 29. An apparatus, comprising: at least one memory: at least one transceiver: at least one processor communicatively coupled to the at least one memory and the at least one transceiver, and configured to: determine channel reciprocity information for a sensing channel associated with a first sensing node and a second sensing node: generate time reversal precoding information based at least in part on the channel reciprocity information; and provide the time reversal precoding information to at least one of the first sensing node and the second sensing node.

Clause 30. The apparatus of clause 29, wherein the time reversal precoding information includes a time reversed filter based on a reversed channel impulse response for the sensing channel.

Clause 31. The apparatus of clause 29, wherein the time reversal precoding information includes an indication to activate or deactivate time reversal precoding on at least one of the first sensing node and the second sensing node.

Clause 32. The apparatus of clause 29, wherein the channel reciprocity information comprises a channel impulse response for the sensing channel.

Clause 33. The apparatus of clause 29, wherein the channel reciprocity information comprises one or more channel reciprocity metrics including a signal to noise ratio for a reference signal transmitted with the sensing channel, and/or a Doppler observation associated with a sensing signal transmitted with the sensing channel.

Clause 34. The apparatus of clause 29, wherein the at least one processor is further configured to receive radio frequency sensing capability information, and generate the time reversal precoding information based at least in part on the radio frequency sensing capability information.

Clause 35. The apparatus of clause 29, wherein the at least one processor is further configured to provide the channel reciprocity information as an input to a machine learning module and receive the time reversal precoding information as an output of the machine learning module to generate the time reversal precoding information.

Clause 36. The apparatus of clause 29, wherein the first sensing node is a user equipment and the second sensing node is a base station.

Clause 37. The apparatus of clause 29, wherein the time reversal precoding information is associated with a location of the first sensing node and/or the second sensing node.

Clause 38. An apparatus, comprising: at least one memory: at least one transceiver: at least one processor communicatively coupled to the at least one memory and the at least one transceiver, and configured to: transmit a first radio frequency sensing signal: receive a first channel metric based on the first radio frequency sensing signal: receive a second radio frequency sensing signal: determine a second channel metric based on the second radio frequency sensing signal; and provide indications of the first channel metric and the second channel metric to a network entity.

Clause 39. The apparatus of clause 38, wherein the first radio frequency sensing signal is a downlink reference signal comprising at least one of a positioning reference signal (PRS), a channel state information reference signal (CSI-RS), a primary synchronization signal (PSS), and/or a secondary synchronization signal (SSS).

Clause 40. The apparatus of clause 38, wherein the second radio frequency sensing signal is an uplink reference signal comprising at least one of a sounding reference signal (SRS), a demodulation reference signal (DMRS), and/or a phase tracking reference signal (PTRS).

Clause 41. The apparatus of clause 38, wherein the first channel metric comprises a first channel impulse response associated with the first radio frequency sensing signal.

Clause 42. The apparatus of clause 41, wherein the second channel metric comprises a second channel impulse response associated with the second radio frequency sensing signal.

Clause 43. The apparatus of clause 38, wherein the first channel metric comprises one or more channel reciprocity metrics including a signal to noise ratio and/or a Doppler observation associated with the first radio frequency sensing signal.

Clause 44. The apparatus of clause 38, wherein the first channel metric comprises one or more non-radio frequency features including a time stamp, an indication of a weather condition, and/or information obtained from a sensor associated with a sensing node.

Clause 45. The apparatus of clause 38, wherein the second channel metric comprises one or more channel reciprocity metrics including a signal to noise ratio and/or a Doppler observation associated with the second radio frequency sensing signal.

Clause 46. The apparatus of clause 38, wherein the network entity is a sensing server.

Clause 47. The apparatus of clause 38, wherein the at least one processor is further configured to receive an indication of time reversal precoding from the network entity.

Clause 48. An apparatus, comprising: at least one memory: at least one transceiver: at least one processor communicatively coupled to the at least one memory and the at least one transceiver, and configured to: receive radio frequency sensing information from a sensing node: generate a channel reciprocity prediction based at least in part on the radio frequency sensing information and a channel reciprocity prediction model; and provide an indication for time reversal precoding to the sensing node based on the channel reciprocity prediction.

Clause 49. The apparatus of clause 48, wherein the indication for time reversal precoding includes a time reversed filter based on reversing channel impulse response information received from the sensing node.

Clause 50. The apparatus of clause 48, wherein the indication for time reversal precoding includes an indication to activate or deactivate time reversal precoding on the sensing node.

Clause 51. The apparatus of clause 48, wherein the radio frequency sensing information includes a channel impulse response obtained by the sensing node.

Clause 52. The apparatus of clause 48, wherein the radio frequency sensing information comprises one or more channel reciprocity metrics including a signal to noise ratio for a reference signal received by the sensing node, and/or a Doppler observation associated with a sensing signal received by the sensing node.

Clause 53. The apparatus of clause 48, wherein the at least one processor is further configured to receive radio frequency sensing capability information associated with the sensing node, and generate the indication for time reversal precoding based at least in part on the radio frequency sensing capability information.

Clause 54. The apparatus of clause 48, wherein the sensing node is a user equipment, and the at least one processor is further configured to provide the indication for time reversal precoding to the user equipment via at least one of a downlink control information message, a medium access control message, and a radio resource control message.

Clause 55. The apparatus of clause 48, wherein the indication for time reversal precoding is associated with a location of the sensing node.

Clause 56. The apparatus of clause 48, wherein the at least one processor is further configured to provide the radio frequency sensing information to a network entity and receiving the channel reciprocity prediction from the network entity.

Clause 57. An apparatus for generating time reversal precoding information for radio frequency sensing operations, comprising: means for determining channel reciprocity information for a sensing channel associated with a first sensing node and a second sensing node: means for generating time reversal precoding information based at least in part on the channel reciprocity information; and means for providing the time reversal precoding information to at least one of the first sensing node and the second sensing node.

Clause 58. An apparatus for training a channel reciprocity prediction model, comprising: means for transmitting a first radio frequency sensing signal: means for receiving a first channel metric based on the first radio frequency sensing signal: means for receiving a second radio frequency sensing signal: means for determining a second channel metric based on the second radio frequency sensing signal; and means for providing indications of the first channel metric and the second channel metric to a network entity.

Clause 59. An apparatus for generating channel reciprocity information for radio frequency sensing operations, comprising: means for receiving radio frequency sensing information from a sensing node: means for generating a channel reciprocity prediction based at least in part on the radio frequency sensing information and a channel reciprocity prediction model; and means for providing an indication for time reversal precoding to the sensing node based on the channel reciprocity prediction.

Clause 60. A non-transitory processor-readable storage medium comprising processor-readable instructions configured to cause one or more processors to generate time reversal precoding information for radio frequency sensing operations, comprising code for: determining channel reciprocity information for a sensing channel associated with a first sensing node and a second sensing node: generating time reversal precoding information based at least in part on the channel reciprocity information; and providing the time reversal precoding information to at least one of the first sensing node and the second sensing node.

Clause 61. A non-transitory processor-readable storage medium comprising processor-readable instructions configured to cause one or more processors to train a channel reciprocity prediction model, comprising code for: transmitting a first radio frequency sensing signal: receiving a first channel metric based on the first radio frequency sensing signal: receiving a second radio frequency sensing signal; determining a second channel metric based on the second radio frequency sensing signal; and providing indications of the first channel metric and the second channel metric to a network entity.

Clause 62. A non-transitory processor-readable storage medium comprising processor-readable instructions configured to cause one or more processors to generate channel reciprocity information for radio frequency sensing operations, comprising code for: receiving radio frequency sensing information from a sensing node; generating a channel reciprocity prediction based at least in part on the radio frequency sensing information and a channel reciprocity prediction model; and providing an indication for time reversal precoding to the sensing node based on the channel reciprocity prediction.

What is claimed is:

1. A method for generating time reversal precoding information for radio frequency sensing operations, comprising:

receiving a sensing report message comprising sensed object information from a first sensing node or a second sensing node, wherein the sensed object information comprises one or more object-related parameters of at least one sensed object;

determining channel reciprocity information for a sensing channel associated with the first sensing node and the second sensing node, wherein the channel reciprocity information is based at least in part on at least one feature derived from the sensed object information in the sensing report message;

generating time reversal precoding information based at least in part on the channel reciprocity information; and providing the time reversal precoding information to at least one of the first sensing node and the second sensing node.

2. The method of claim 1, wherein the time reversal precoding information includes a time reversed filter based on a reversed channel impulse response for the sensing channel.

3. The method of claim 1, wherein the time reversal precoding information includes an indication to activate or deactivate time reversal precoding on at least one of the first sensing node and the second sensing node.

4. The method of claim 1, wherein the channel reciprocity information comprises a channel impulse response for the sensing channel.

5. The method of claim 1, wherein the channel reciprocity information comprises one or more channel reciprocity metrics including a signal to noise ratio for a reference signal transmitted with the sensing channel, and/or a Doppler observation associated with a sensing signal transmitted with the sensing channel.

6. The method of claim 1, further comprising receiving radio frequency sensing capability information, wherein generating the time reversal precoding information is based at least in part on the radio frequency sensing capability information.

7. The method of claim 1, wherein generating the time reversal precoding information includes providing the channel reciprocity information as an input to a machine learning module and receiving the time reversal precoding information as an output of the machine learning module.

8. The method of claim 1, wherein the first sensing node is a user equipment and the second sensing node is a base station.

9. The method of claim 1, wherein the time reversal precoding information is associated with a location of the first sensing node and/or the second sensing node.

10. An apparatus, comprising:

at least one memory;

at least one transceiver;

at least one processor communicatively coupled to the at least one memory and the at least one transceiver, and configured to:

receive a sensing report message comprising sensed object information from a first sensing node or a second sensing node, wherein the sensed object information comprises one or more object-related parameters of at least one sensed object;

determine channel reciprocity information for a sensing channel associated with the first sensing node and the second sensing node, wherein the channel reciprocity information is based at least in part on at least one feature derived from the sensed object information in the sensing report message;

generate time reversal precoding information based at least in part on the channel reciprocity information; and provide the time reversal precoding information to at least one of the first sensing node and the second sensing node.

11. The apparatus of claim 10, wherein the time reversal precoding information includes an indication to activate or deactivate time reversal precoding on at least one of the first sensing node and the second sensing node.

12. The apparatus of claim 10, wherein the channel reciprocity information comprises a channel impulse response for the sensing channel.

13. The apparatus of claim 10, wherein the channel reciprocity information comprises one or more channel reciprocity metrics including a signal to noise ratio for a reference signal transmitted with the sensing channel, and/or a Doppler observation associated with a sensing signal transmitted with the sensing channel.

14. The apparatus of claim 10, wherein the at least one processor is further configured to receive radio frequency sensing capability information, and generate the time reversal precoding information based at least in part on the radio frequency sensing capability information.

15. The apparatus of claim 10, wherein the at least one processor is further configured to provide the channel reciprocity information as an input to a machine learning module and receive the time reversal precoding information as an output of the machine learning module to generate the time reversal precoding information.

16. The apparatus of claim 10, wherein the time reversal precoding information includes a time reversed filter based on a reversed channel impulse response for the sensing channel.

17. The apparatus of claim 10, wherein the first sensing node is a user equipment and the second sensing node is a base station.

18. The apparatus of claim 10, wherein the time reversal precoding information is associated with a location of the first sensing node and/or the second sensing node.

19. An apparatus for generating time reversal precoding information for radio frequency sensing operations, comprising:

means for receiving a sensing report message comprising sensed object information from a first sensing node or a second sensing node, wherein the sensed object information comprises one or more object-related parameters of at least one sensed object;

means for determining channel reciprocity information for a sensing channel associated with the first sensing node and the second sensing node, wherein the channel reciprocity information is based at least in part on at least one feature derived from the sensed object information in the sensing report message;

means for generating time reversal precoding information based at least in part on the channel reciprocity information; and means for providing the time reversal precoding information to at least one of the first sensing node and the second sensing node.

20. The apparatus of claim 19, wherein the time reversal precoding information includes a time reversed filter based on a reversed channel impulse response for the sensing channel.

21. The apparatus of claim 19, wherein the time reversal precoding information includes an indication to activate or deactivate time reversal precoding on at least one of the first sensing node and the second sensing node.

22. The apparatus of claim 19, wherein the channel reciprocity information comprises a channel impulse response for the sensing channel.

23. The apparatus of claim 19, wherein the channel reciprocity information comprises one or more channel reciprocity metrics including a signal to noise ratio for a reference signal transmitted with the sensing channel, and/or a Doppler observation associated with a sensing signal transmitted with the sensing channel.

24. The apparatus of claim 19, further comprising means for receiving radio frequency sensing capability information, wherein the means for generating the time reversal precoding information comprise means for generating the time reversal precoding information based at least in part on the radio frequency sensing capability information.

25. A non-transitory processor-readable storage medium comprising processor-readable instructions configured to cause one or more processors to generate time reversal precoding information for radio frequency sensing operations, comprising code for:

receiving a sensing report message comprising sensed object information from a first sensing node or a second sensing node, wherein the sensed object information comprises one or more object-related parameters of at least one sensed object;

determining channel reciprocity information for a sensing channel associated with the first sensing node and the second sensing node, wherein the channel reciprocity information is based at least in part on at least one feature derived from the sensed object information in the sensing report message;

generating time reversal precoding information based at least in part on the channel reciprocity information; and providing the time reversal precoding information to at least one of the first sensing node and the second sensing node.

26. The non-transitory processor-readable storage medium of claim 25, wherein the time reversal precoding information includes a time reversed filter based on a reversed channel impulse response for the sensing channel.

27. The non-transitory processor-readable storage medium of claim 25, wherein the time reversal precoding information includes an indication to activate or deactivate time reversal precoding on at least one of the first sensing node and the second sensing node.

28. The non-transitory processor-readable storage medium of claim 25, wherein the channel reciprocity information comprises a channel impulse response for the sensing channel.

29. The non-transitory processor-readable storage medium of claim 25, wherein the channel reciprocity information comprises one or more channel reciprocity metrics including a signal to noise ratio for a reference signal transmitted with the sensing channel, and/or a Doppler observation associated with a sensing signal transmitted with the sensing channel.

30. The non-transitory processor-readable storage medium of claim 25, further comprising code for receiving radio frequency sensing capability information, wherein the code for generating the time reversal precoding information comprises code for generating the time reversal precoding information based at least in part on the radio frequency sensing capability information.

* * * * *